United States Patent [19]

Nonoshita et al.

[11] Patent Number: 5,006,937
[45] Date of Patent: Apr. 9, 1991

[54] IMAGING DATA PROCESSING APPARATUS

[75] Inventors: Hiroshi Nonoshita, Yokohama; Seiji Saito, Yokosuka, both of Japan

[73] Assignee: Canon Kabushiki Kaisha, Tokyo, Japan

[21] Appl. No.: 560,294

[22] Filed: Jul. 27, 1990

Related U.S. Application Data

[60] Continuation of Ser. No. 357,677, May 26, 1989, abandoned, which is a division of Ser. No. 937,334, Dec. 3, 1986, abandoned.

[30] Foreign Application Priority Data

| Dec. 6, 1985 | [JP] | Japan | 60-273468 |
| Dec. 6, 1985 | [JP] | Japan | 60-273469 |
| Dec. 25, 1985 | [JP] | Japan | 60-290351 |
| Dec. 25, 1985 | [JP] | Japan | 60-290352 |

[51] Int. Cl.$^5$ ............................................. H04N 1/23
[52] U.S. Cl. ............................ 358/456; 358/460
[58] Field of Search ............... 358/166, 455, 460, 458, 358/448, 443, 456, 465, 146, 167

[56] References Cited

U.S. PATENT DOCUMENTS

| 3,535,443 | 10/1970 | Rieke | 358/160 |
| 3,686,434 | 8/1972 | Lemelson | 358/210 |
| 4,196,450 | 4/1980 | Miller et al. | |
| 4,394,688 | 7/1983 | Iida et al. | 358/166 |
| 4,437,122 | 3/1984 | Walsh et al. | 358/447 |
| 4,498,104 | 2/1985 | Schulz | 358/167 |
| 4,541,011 | 9/1985 | Mayer et al. | |
| 4,570,163 | 2/1986 | Smith | 358/210 |
| 4,742,399 | 5/1988 | Kitamura | 358/466 |

FOREIGN PATENT DOCUMENTS

| 0077410 | 4/1983 | European Pat. Off. | |
| 2928378 | 1/1980 | Fed. Rep. of Germany | |
| 3419693 | 11/1984 | Fed. Rep. of Germany | |
| 57-082 | 4/1982 | Japan | 358/447 |
| WO81/02083 | 7/1981 | PCT Int'l Appl. | |
| 2089165 | 6/1982 | United Kingdom | |

Primary Examiner—James J. Groody
Assistant Examiner—David E. Harvey
Attorney, Agent, or Firm—Fitzpatrick, Cella, Harper & Scinto

[57] ABSTRACT

An image processing apparatus includes input circuitry for inputting an analog video signal, first conversion circuitry for converting the input analog video signal into multi-value data, and a memory for storing the multi-value data. Second conversion circuitry is provided for converting the multi-value data stored in the memory to binary data when executing its conversion process. The second conversion circuitry (1) detects a density gradient by comparing the multi-value data of pixels around a pixel to be converted with each other in each of vertical, lateral, and oblique directions, and (2) selects a multi-bit image pattern from a plurality of image patterns in response to the detected density gradient.

12 Claims, 20 Drawing Sheets

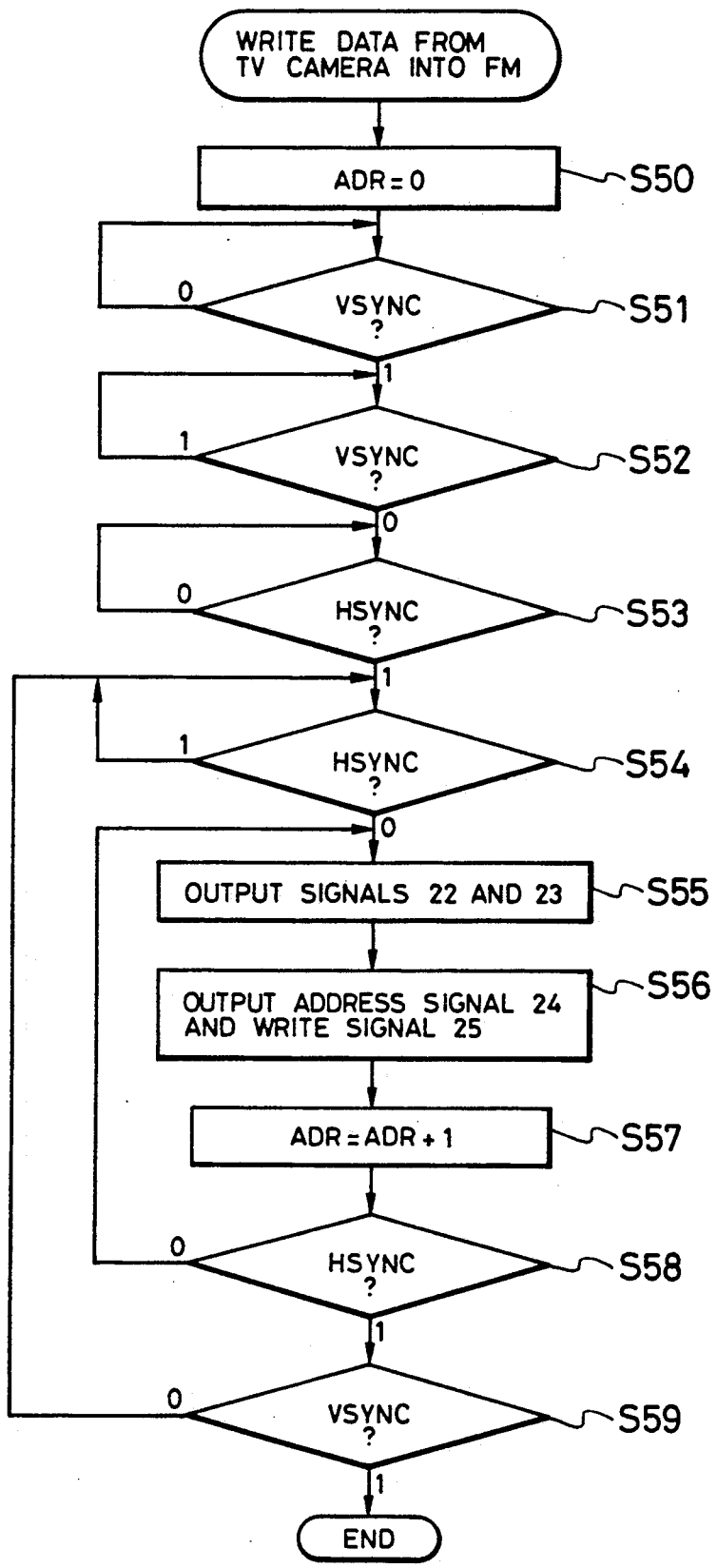

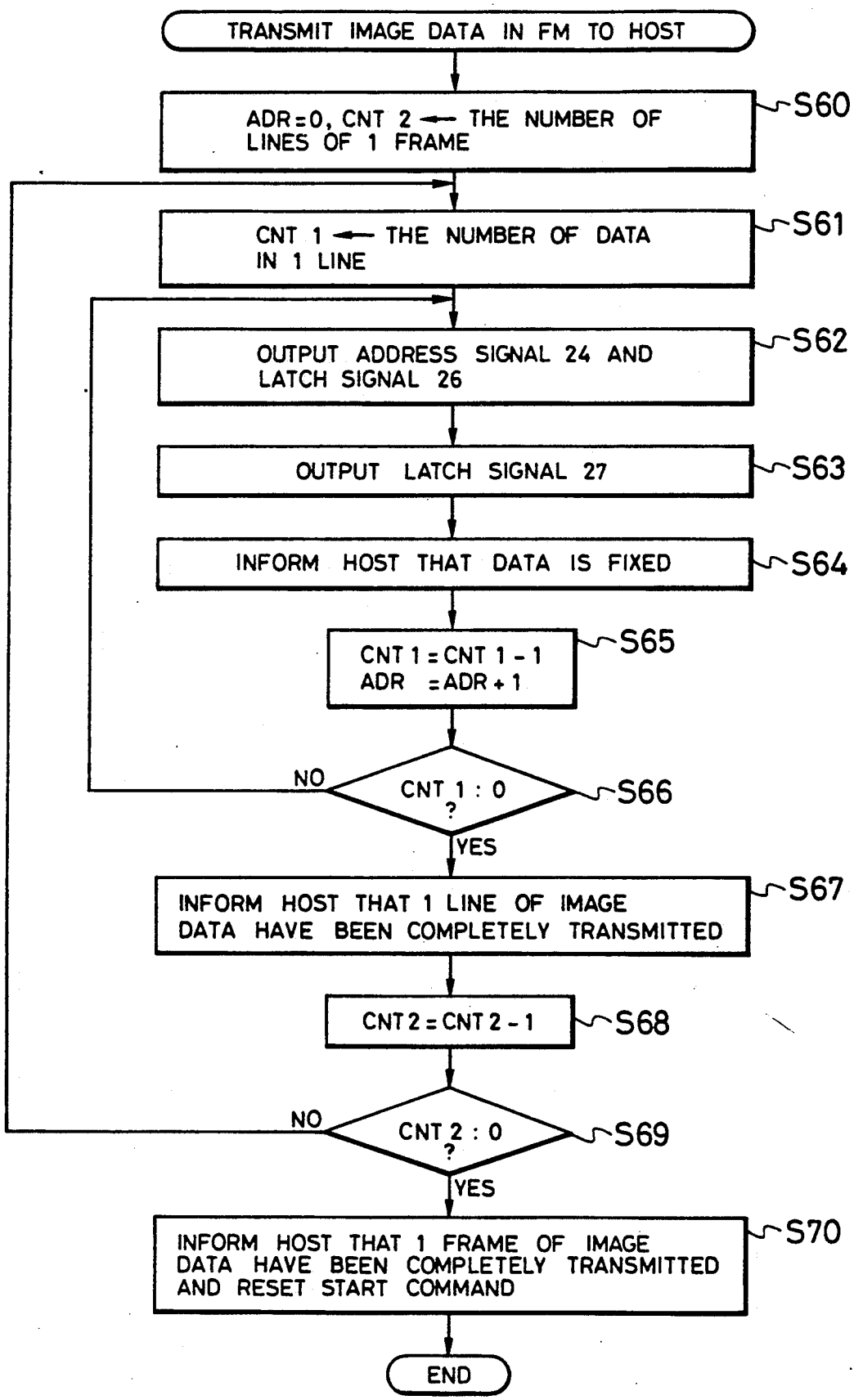

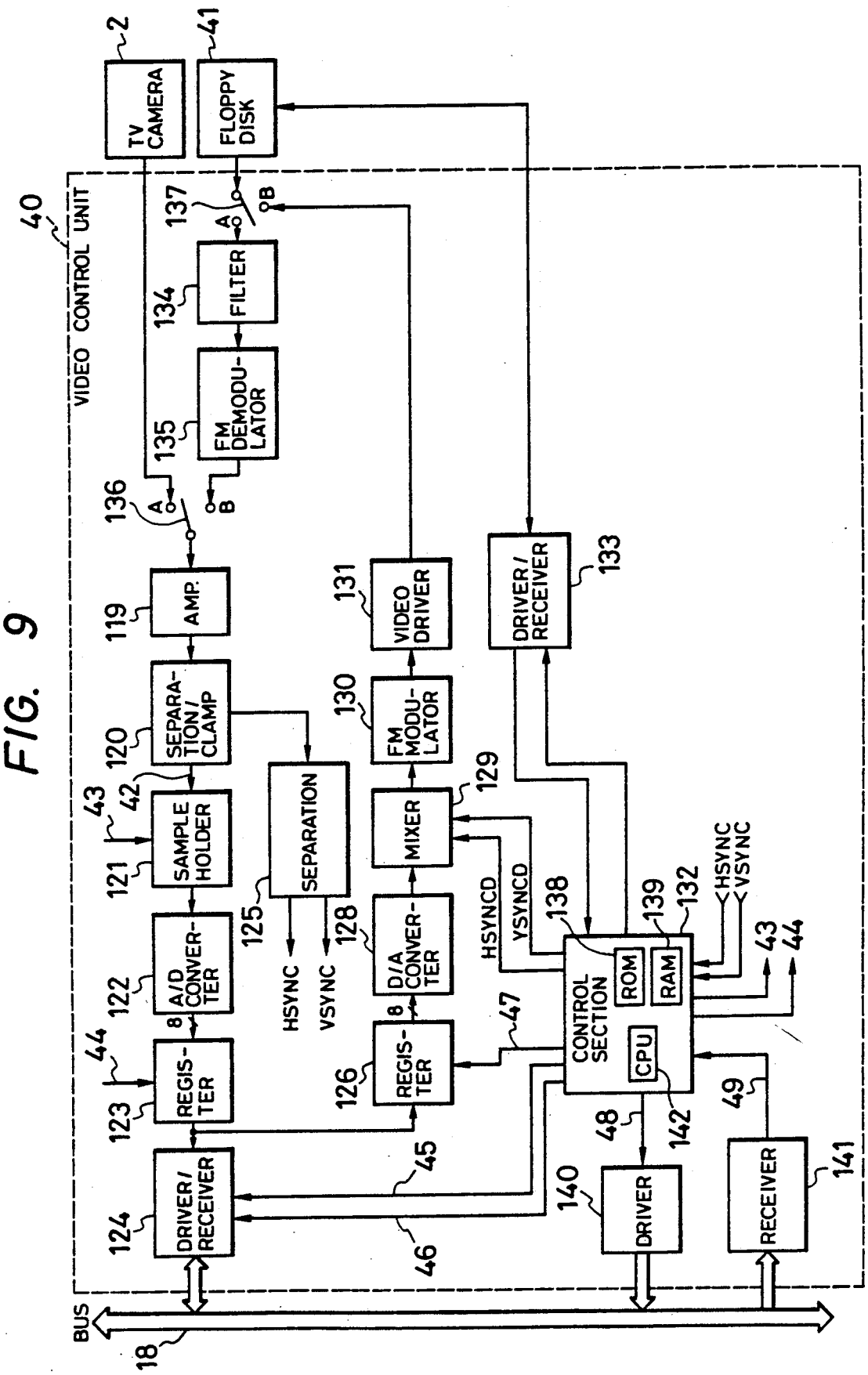

IMAGING DATA PROCESSING APPARATUS

This application is a continuation of application Ser. No. 357,677 filed May 26, 1989, now abandoned which is a divisional of application Ser. No. 937,334 filed Dec. 3, 1986, now abandoned.

BACKGROUND OF THE INVENTION

1. Field of the Invention

The present invention relates to an image data processing apparatus to which a television (TV) camera is connected and, more particularly, to an image data processing apparatus for converting image data from a TV camera into a digital signal and processing it.

2. Related Background Art

In recent years, in association with the rapid development of image data processing apparatuses including mainly electronic computers, there has been developed the image data processing apparatus in which images drawn on documents are read out by an image inputting apparatus such as an image reading apparatus or the like. The readout image data is processed by an arithmetic operation processing apparatus, the processed image data is sent to an output apparatus such as a laser beam printer or the like, and thereby the recording image is obtained. However, to input a stereoscopic image such as scenery or the like to the image data processing apparatus and record it, the scenery must be photographed by a camera as a still photograph. Then, the developed still photograph must be read and input by the image input apparatus such as an image reading apparatus or the like, so that many troublesome operations are necessary. On the other hand, a general image data processing apparatus such that the stereoscopic image photographed by the TV camera apparatus can be directly output as the recording image is not put into practical use yet.

In the conventional image data processing apparatus, a density pattern method, a dither method, or the like is used as the method of expressing a half-tone image such as a photograph or the like as a binary digital signal. However, if the density of pixel data is converted by use of a fixed pattern, a moire is produced for every pixel matrix which was referred. Further, there is also the drawback such that if a random pattern is used, the noise increases and the quality of the reproduced image deteriorates.

Moreover, according to the density pattern method and dither method, even if the resolution of the output apparatus changes, the converting method is always constant. Therefore, if such a converting method is used in combination with the output apparatus having a high resolution, the data needs to be thinned out when the data is supplied to the output apparatus having a low resolution, so that the picture quality deteriorates because of the thin-out process of the data. There is also the drawback such that, on the contrary, if the resolution is set in accordance with the output apparatus having a low resolution, the high picture quality cannot be derived from the output apparatus having a high resolution.

SUMMARY OF THE INVENTION

The present invention is made in consideration of the foregoing conventional examples and it is an object of the invention to provide an image data processing apparatus in which image data which is photographed and output by a TV camera apparatus is monitored by a CRT (cathode ray tube) display apparatus or the like, and the camera can be controlled by the display apparatus so as to read the optimum image, and the image data can be input and subjected to the image processes such as edition, recording, and the like.

It is another object of the invention to provide an image data processing apparatus in which image data which is photographed and output by a TV camera apparatus is digitized and processed, and the resultant digital image data can be written into a memory system such as a floppy disk system or the like, and the image data in the memory system of the floppy disk system or the like can be input and subjected to the image processing.

Still another object of the invention is to provide an image data processing apparatus in which a stereoscopic image photographed by a TV camera apparatus can be directly output as a recording image.

Still another object of the invention is to provide an image data processing apparatus in which by determining the density pattern with reference to the pixels around the pixel to be converted, a continuous output image of excellent gradation and high quality can be derived.

Still another object of the invention is to provide an image data processing apparatus in which a binarization expressing method can be changed in accordance with the resolution of an output apparatus and an output of a good picture quality can be obtained irrespective of the kind of output apparatus.

Still another object of the invention is to provide an image data processing apparatus in which a half-tone image which is difficult to be expressed by a binarization expression can be expressed with gradation in accordance with the characteristics of an output apparatus.

BRIEF DESCRIPTION OF THE DRAWINGS

FIG. 5 is an operation flowchart for writing the image data from the TV camera into a frame memory;

FIG. 6 is a flowchart for transmitting the image data from the frame memory to a work station;

FIG. 9 is a block diagram of a video control unit of the second practical example;

DETAILED DESCRIPTION OF THE PREFERRED EMBODIMENTS

A practical example of the present invention will be described in detail hereinbelow with reference to the accompanying drawings.

First Practical Example

Figure 1:
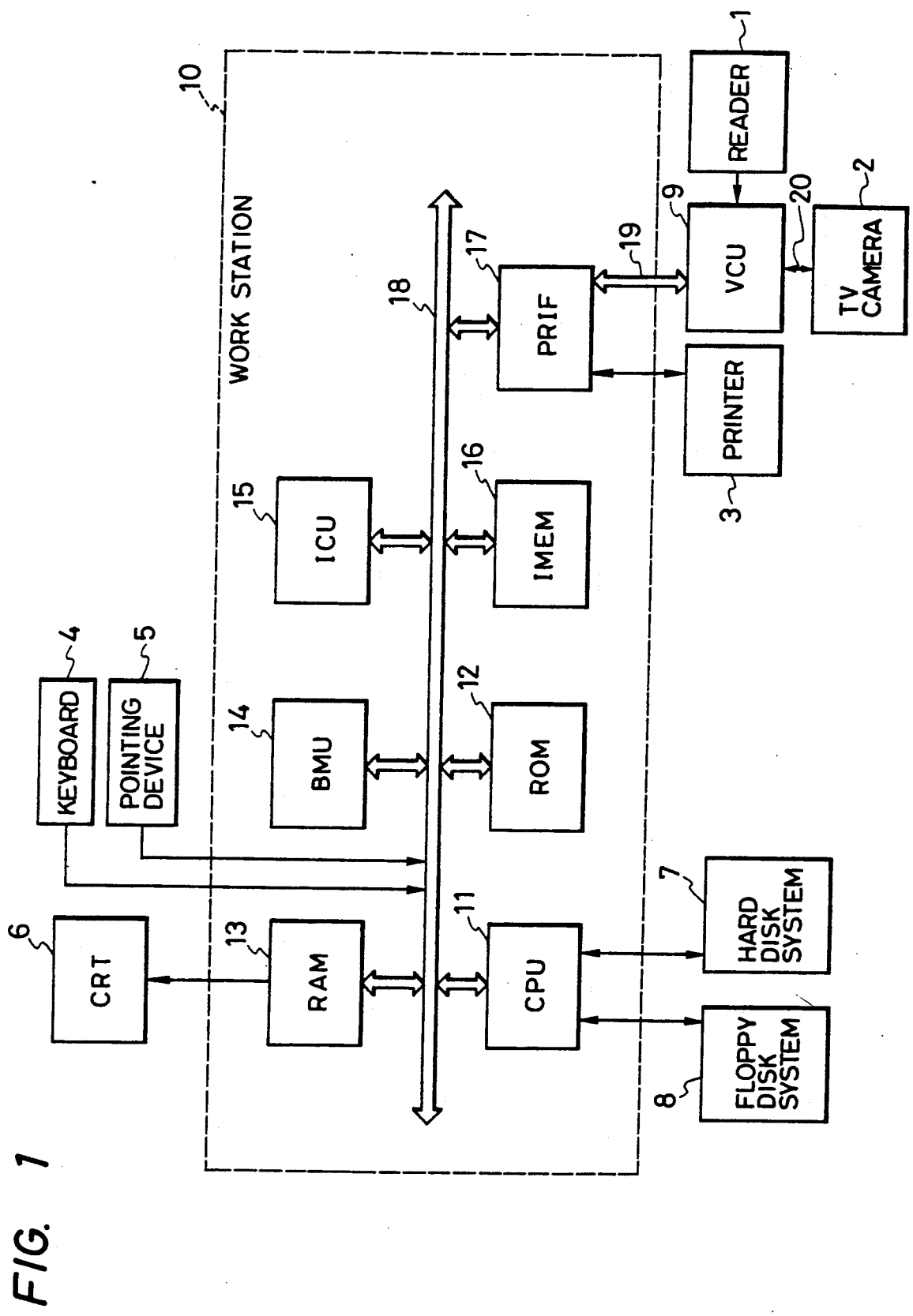
FIG. 1 is a block diagram of an image data processing apparatus of a first practical example of the present invention.
Figure 2:
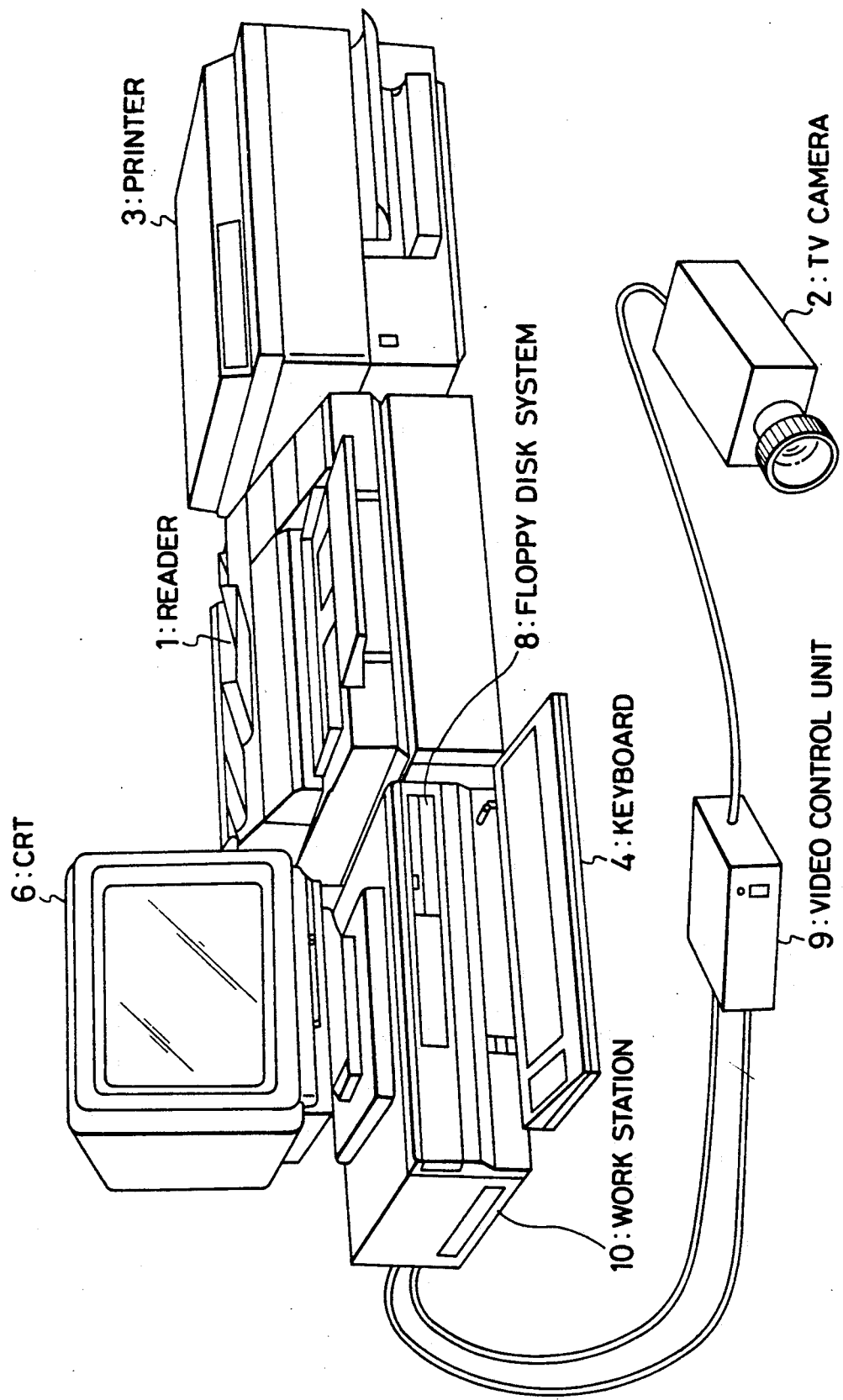
FIG. 2 is an external perspective view of the first practical example.

FIG. 1 is a block diagram of an image data processing apparatus showing the first practical example of the present invention. FIG. 2 is an external perspective view showing the first practical example. In these diagrams, the same parts and components are designated by the same reference numerals.

Reference numeral 1 denotes a reader having a photoelectric converting element. The reader 1 reads an image on a desired document and outputs it as a digital signal. A TV camera 2 outputs the photographed image as a composite video signal. A printer 3 outputs the hard copy or the like of the image data. A keyboard 4 is used to input characters and the like, to designate a position on a CRT 6 using a cursor, and to input commands such as zoom command, focus command, and the like, which will be explained hereinafter, to the TV camera 2.

A pointing device 5 is used to move the cursor and to easily designate an arbitrary position on the CRT 6. A hard disk system 7 and a floppy disk system 8 are provided as external memory systems. In place of these systems, random access memories which are backed up by a battery may be also used. A video control unit (VCU) 9 is connected among the reader 1, the TV camera 2, and a work station 10 and controls the image signal from the TV camera and also controls the TV camera.

The composition of the work station 10 will now be described. The work station 10 has a CPU 11 for controlling the whole apparatus and the peripheral equipment; an ROM 12 in which control programs to be executed by the CPU 11 and data such as character patterns and the like are stored; and an RAM 13 which is used as a work memory of the CPU 11 and as a video memory of the CRT 6. Further, a bit manipulation unit (BMU) 14 performs the edition (image processing) of the image data which is displayed on the CRT 6. The image data on the CRT 6 which is designated by the keyboard 4 or pointing device 5 is enlarged, reduced, rotated, moved, cut, or the like by the BMU 14.

An image compression unit (ICU) 15 compresses or expands the image data. A two-dimensional compression (high compression) is used to raise the coding ratio. An image memory (IMEM) 16 has a memory area of 4 Mbytes and stores the image data from the reader 1 and also stores the image data which was edited by the BMU 14. Further, the IMEM 16 stores the image data expanded by the ICU 15 and also stores the word processor code data by key code characters, mixed data, image data which is derived by converting the character code into the image, and the like. A reader/printer interface unit (RPIF) 17 serves as an interface among the work station 10, the printer 3, and the VCU 9. The respective units, memories, and the like in the work station 10 are connected by an internal bus 18.

Figure 3:
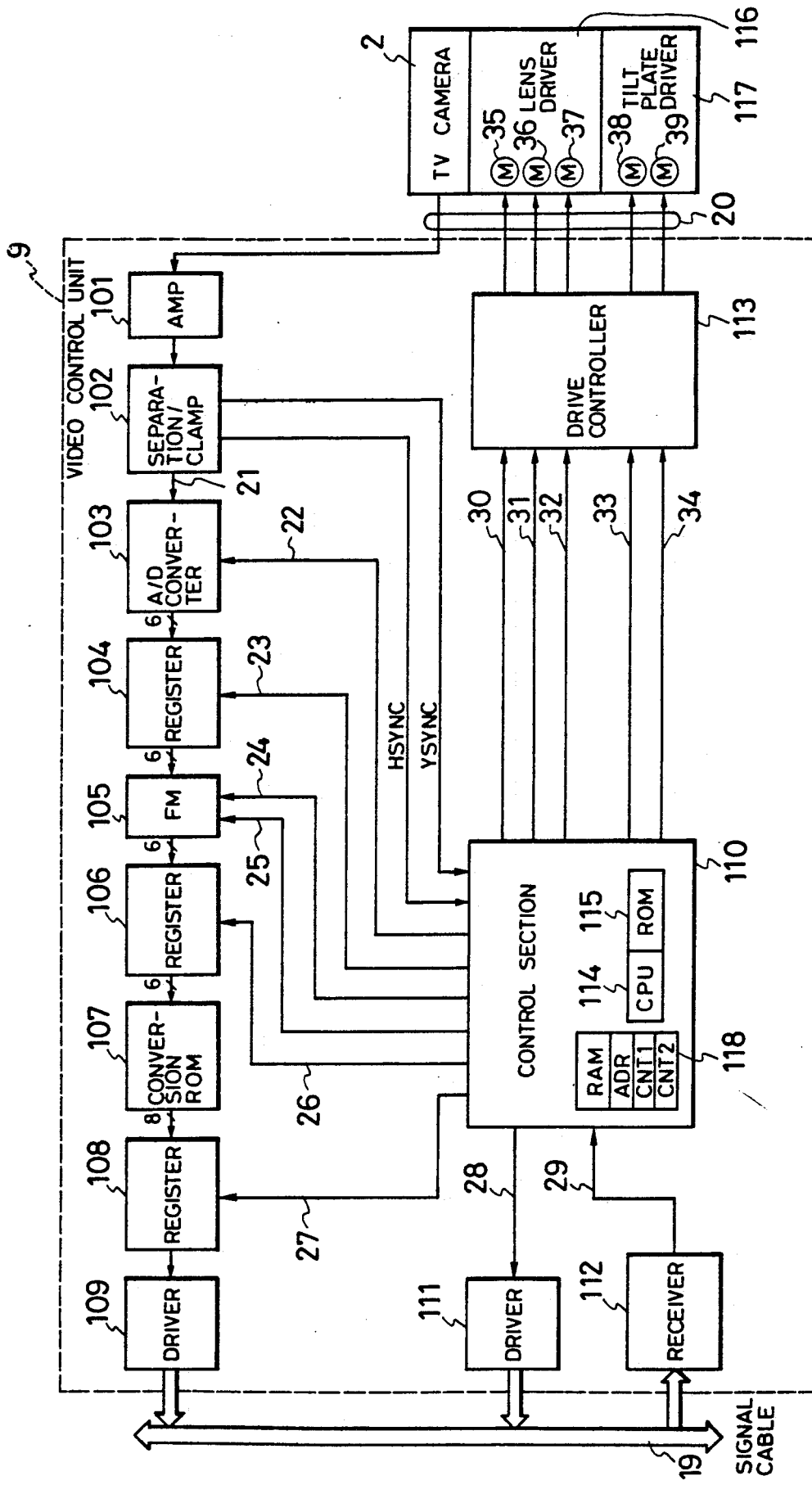
FIG. 3 is a block diagram of a video control unit of the first practical example.

FIG. 3 is a block diagram showing an internal constitution of the video control unit (VCU), in which the same components as those in FIG. 1 are designated by the same reference numerals.

Reference numeral 101 denotes an amplifier (AMP) for amplifying a composite video signal which is sent from the TV camera 2, and 102 is a separation/clamp circuit for separating the composite video signal amplified by the AMP 101 into a video signal 21, a horizontal sync signal (HSYNC) and a vertical sync signal (VSYNC) and for clamping the video signal 21. An A/D converter 103 converts the analog video signal 21 clamped by the separation/clamp circuit 102 into the digital image signal of six bits in response to every clock signal 22 which is generated from a control section 110.

A register 104 latches the 6-bit digital image signal converted by the A/D converter 103 by a latch signal 23 from the control section 110. A frame memory (FM) 105 stores the 6-bit digital image signal from the register 104 by only the amount of one frame of the TV camera 2. Numeral 24 denotes an address signal in the frame memory (FM) 105 which is output from the control section 110 to the FM 105, and 25 is a write signal.

Numeral 106 denotes a register for latching the 6-bit image signal by a latch signal 26; 107 is a conversion ROM for converting the digital image signal from the register 106 into the 8-bit density pattern 108 is a register for latching the 8-bit density pattern by a latch signal 27; and 109 is a driver for outputting the 8-bit density pattern to the RPIF 17 in the work station 10 through a signal cable 19.

Numeral 111 denotes a driver for outputting status signal, command signal, and the like from the control section 110 to the RPIF 17 through the signal cable 19, and 112 is a receiver for receiving the command signal and the like from the RPIF 17.

The control section 110 has a CPU 114, a ROM 115, and an RAM 118 and controls the VCU 9, TV camera 2, and the like, which will be explained hereinafter. A drive controller 113 receives various signals which are output from the control section 110, such as iris signal 30 to control the diaphragm of the lens of the TV camera 2, zoom signal 31 to control the zoom of the lens of the TV camera 2, focus signal 32 to control the focus of the lens of the TV camera 2, signal 33 to control the rotation of the tilt plate of the TV camera 2, and signal 34 to control the vertical movement of the tilt plate of the TV camera 2. The drive controller 113 then outputs control signals of motors 35 to 39 corresponding to a TV camera lens driver 116 and a tilt plate driver 117, respectively.

Figure 4A:
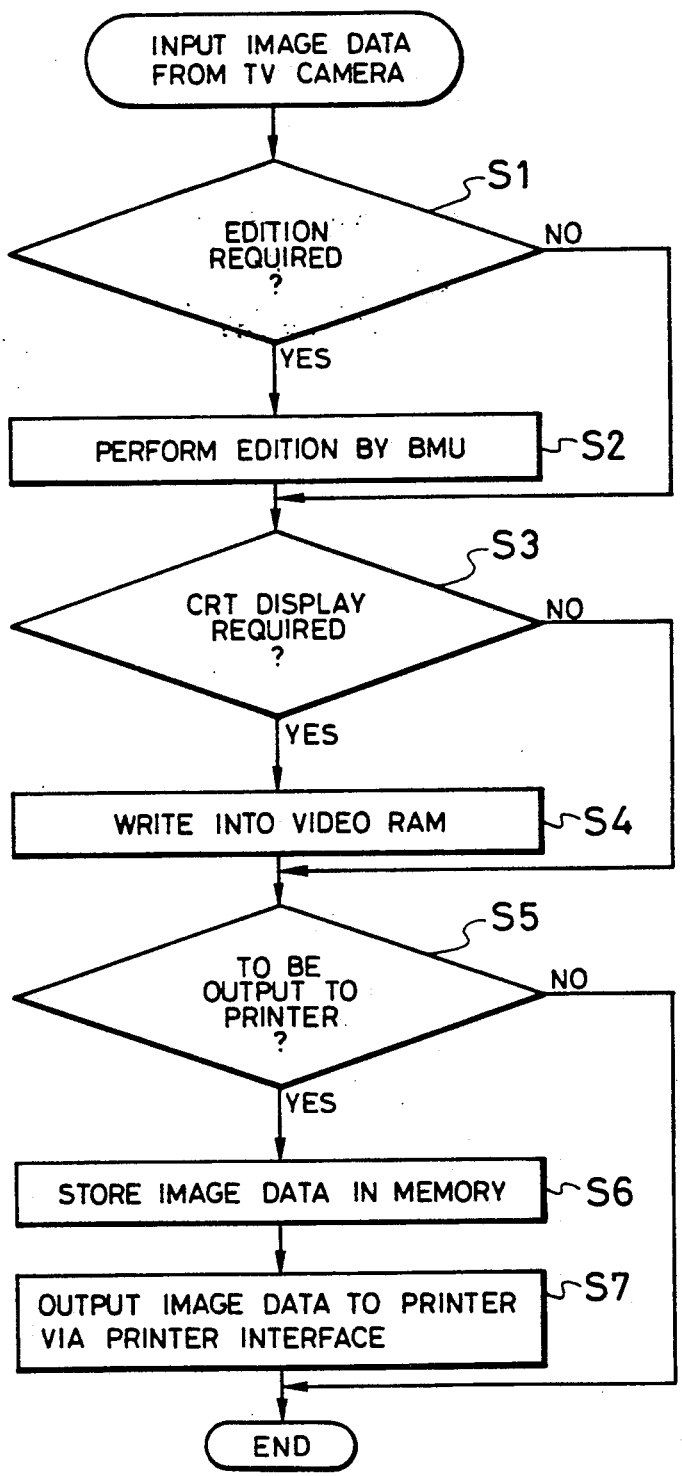
FIG. 4A is a flowchart for inputting image data from a TV camera by a CPU in an image data processing apparatus of the invention.

FIG. 4A is a schematic operation flowchart of the control program which is stored in the ROM 12 and which is executed by the CPU 11. In particular, FIG.

4A shows the schematic operation flowchart when the image data was received by the Tv camera 2.

This program is started when the image data read by an TV camera 2 is sent as the NTSC signal to the VCU 9 in FIG. 1 and a video signal and sync signals are transmitted by the VCU 9 to the system bus 18 through the reader/printer interface unit (RPIF) 17.

When the video signal is output from the VCU 9 to the system bus 18, a check is first made to see if the image data needs to be edited or not in step S1. If the edition is necessary, the image data from the VCU 9 is input to the bit manipulation unit (BMU) 14 and edited in step S2. In step S3, a check is made to see if the image data needs to be displayed on the CRT 6 or not. If it is necessary to display the image data on the CRT 6, this image data is written into the video RAM 13 and displayed on the CRT 6 in step S4.

In step S5, a check is made to see if the image data needs to be output to the printer 3 or not. If YES, the image data is temporarily stored into the image data area in the memory 16 in step S6 and the image data is sequentially read out from this image data area in step S7. The readout image data is output to the printer 3 through the printer interface unit 17 and printed.

The operation of the video control unit a will now be described with reference to FIGS. 4B to 6.

The case where the operator controls the lens, tilt plate, and the like of the TV camera 2 by the keyboard 4 while displaying the image data from the TV camera 2 on the CRT 6, and displays and outputs the image data onto the CRT 6 will be described with reference to the flowcharts of control programs stored in the ROM 115 shown in FIGS. 4B to 6.

Figure 4B:
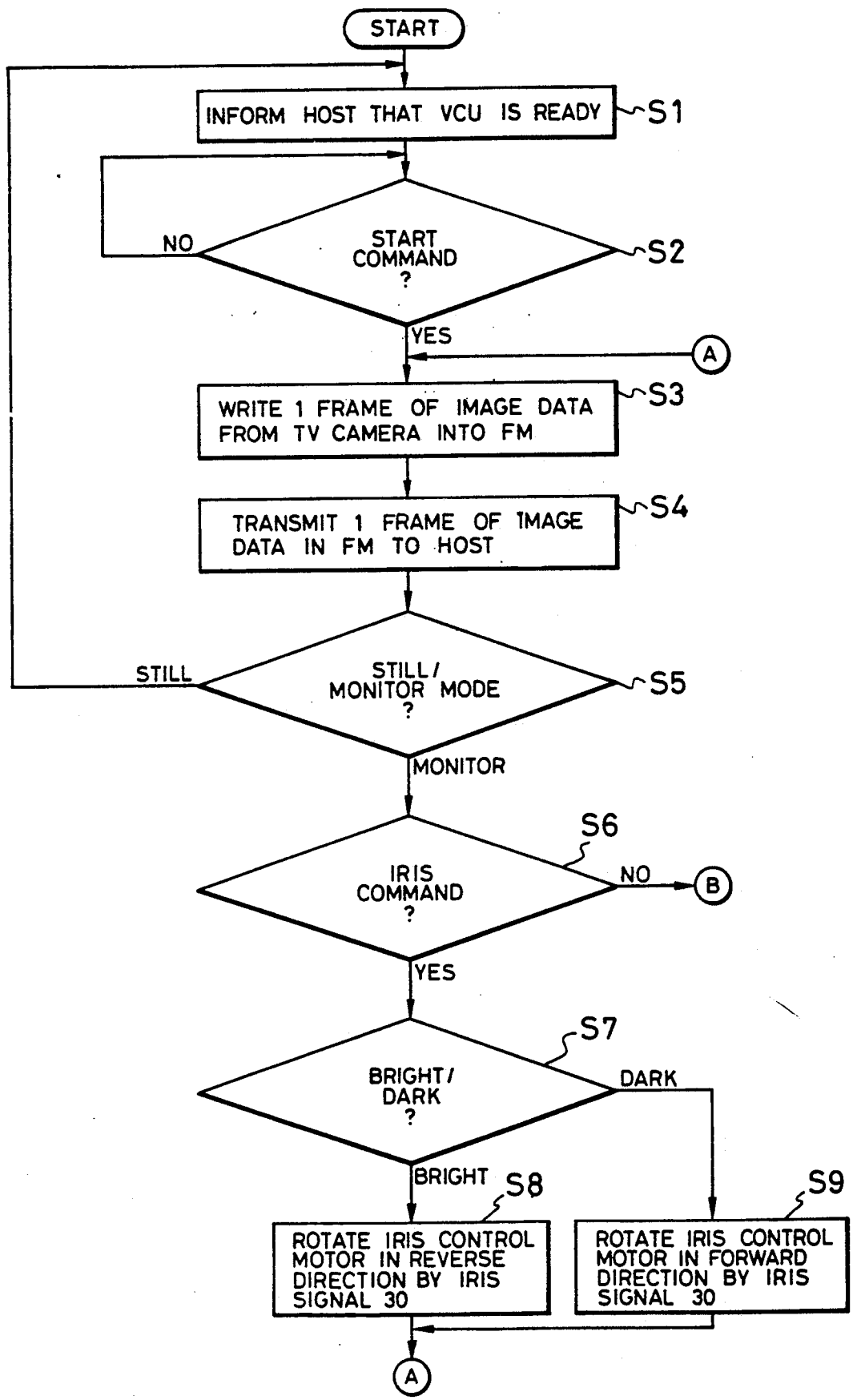
FIGS. 4B and 4C are operation flowcharts of a controller in the video control unit of the first practical example.
Figure 4C:
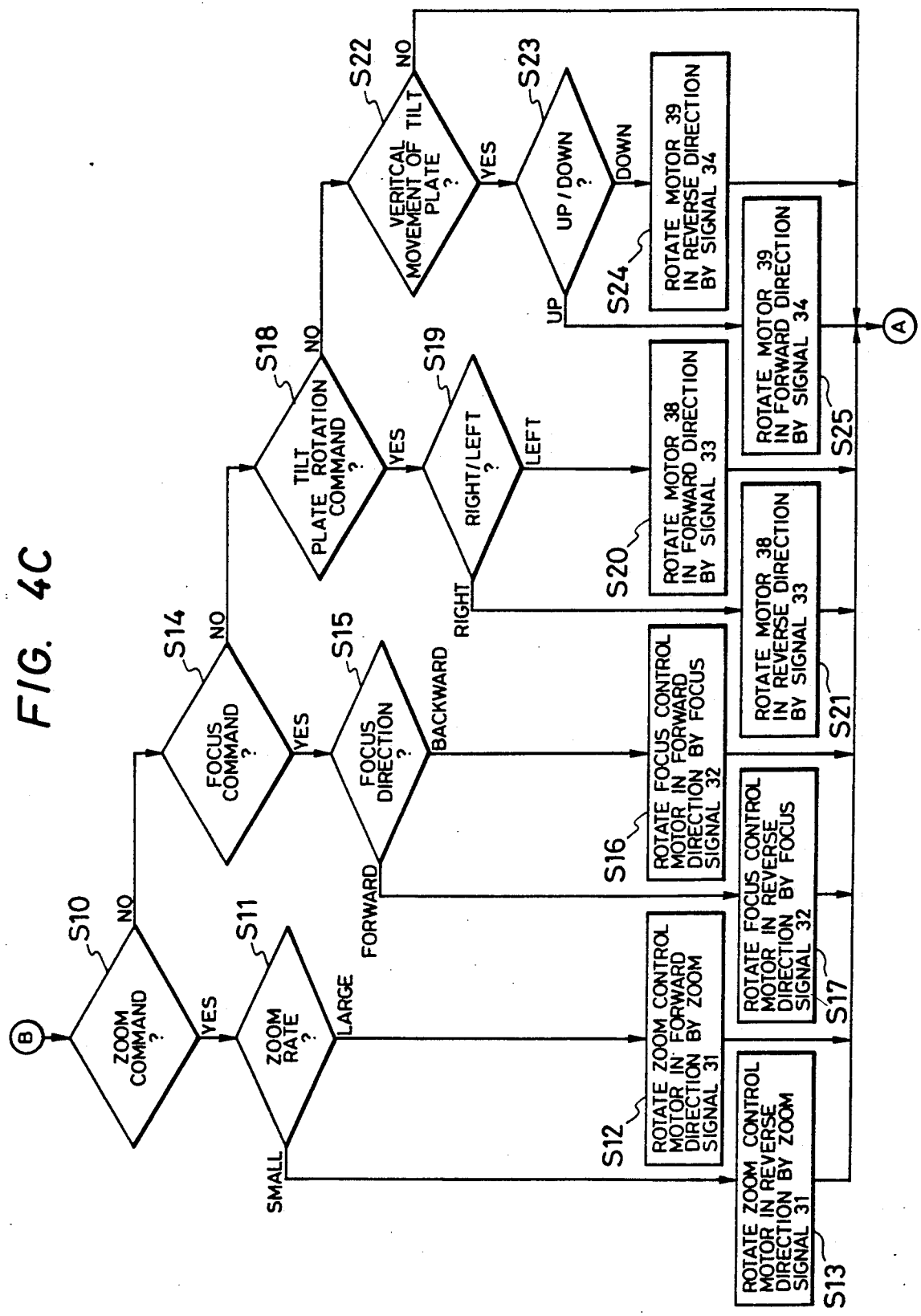

FIGS. 4B and 4C are flowcharts in the case of controlling the TV camera 2. First, in step S1, the fact that the VCU 9 is in the ready state is reported to the RPIF 17 through the signal cable 19. In step S2, the apparatus waits until a start command is input from the work station (hereinafter, referred to as the host) 10.

When the start command is input through the receiver 112, step S3 follows and the image data of one frame from the TV camera 2 is written into the frame memory (FM) 105. In the next step S4, the image data of one frame in the FM 105 is transmitted to the host. Thus, the host writes the image data into the image data area in the RAM 13 through the PRIF 17 and bus 18 and displays it on the CRT 6.

In step S5, a check is made to see if the mode which has previously been designated by the host is the still mode or the monitor mode. In the case of the still mode, the processing routine is returned to step S1 and the image data is displayed. In the case of the monitor mode, on the other hand, step S6 follows for adjustment of the TV camera 2. In step S6 and the subsequent steps, checks are made to see if various control commands of the TV camera have been input from the keyboard 4 connected to the host or not.

When the (iris) command to adjust the diaphragm of the lens of the TV camera 2 is input, step S7 follows and a check is made to see if the iris command is the command to close the diaphragm to darken the image or the command to open the diaphragm to brighten the image. In the case of brightening, step S8 follows and an iris control motor 35 is rotated in the reverse direction by one step by the iris signal 30. On the contrary, in the case of darkening by closing the diaphragm, the diaphragm of the lens is reduced by one step in step S9.

After completion of step S8 or S9, the processing routine is returned to step S3.

In step S10, a check is made to see if the zoom command has been input or not. If YES, a check is made to see if the zoom is enlarged or decreased in step S11. In the case of enlarging the zoom, step S12 follows and the zoom signal 31 is output and a zoom control motor 36 is rotated in the forward direction, thereby increasing the zoom by one step. On the contrary, in the case of reducing the zoom, step S13 follows and the zoom control motor 36 is reversely rotated by the zoom signal 31, thereby decreasing the zoom by one step.

In step S14, a check is made to see if the focus command has been input or not. If YES, the adjusting direction of the focus is checked to see if the focus needs to be moved forward or backward in step S15. In the case of forwardly moving the focus, step S17 follows. In the case of backwardly moving the focus, step S16 follows. By generating the focus signal 32, a focus control motor 37 is rotated in the reverse direction by one step in step S17, while the motor 37 is rotated in the forward direction by one step in step S16.

In step S18, a check is made to see if the rotation command of the tilt plate has been input or not. If YES, a check is made in step S19 to see if the tilt plate needs to be rotated to the right or left. In the case of rotating the tilt plate to the left, step S20 follows and the signal 33 is output to forwardly rotate the motor 38, thereby rotating the tilt plate to the left by one step. On the contrary, in the case of rotating to the right, step S21 follows and the motor 38 is reversely rotated by the signal 33, thereby rotating the tilt plate to the right by one step.

In step S22, a check is made to see if the vertical movement command of the tilt plate has been input or not. If NO, the processing routine is returned to step 13. If YES, step S23 follows and a check is made to see if the tilt plate needs to be moved upwardly or downwardly. In the case of moving the tilt plate downwardly in correspondence to the vertical moving direction, step S24 follows. In the case of moving upwardly, step S25 follows. Then, the motor 39 is reversely or forwardly rotated by one step in response to the signal 34, respectively.

In this manner, the operator can adjust the TV camera 2 while observing the image displayed on the CRT 6 which was input from the TV camera 2. Thereafter, by inputting the still mode command, the processing routine is returned to step S1 from step S5 and the apparatus enters the waiting state in step S2 until the next start command is generated.

FIG. 5 is a flowchart showing the operation shown in step S3 in FIG. 4B to write the image data from the TV camera 2 into the frame memory 105.

First, in step S50, an address ADR in the RAM 118 for counting the address in the FM 105 is set to 0. In step S51, the vertical sync signal (VSYNC) from the separation/clamp circuit 102 is checked to see if it is 1 or 0. If the VSYNC is 1, step S52 follows. If the VSYNC is 0, step S53 follows. In step S53, the horizontal sync signal (HSYNC) from the separation/clamp circuit 102 is checked to see if it is 1 or 0. The synchronization with the HSYNC is performed in steps S53 and S54. In this manner, the synchronization of the head data of one line in one frame is derived.

In step S55, the clock signal 22 is sent to the A/D converter 103, the image data is converted into the 6-bit digital signal and latched into the register 104 by the latch signal 23. In step S56, the content of the ADR is output as the address signal 24 in the FM 105 and the digital image data of six bits is then written into the FM 105 by the write signal 25.

In step S57, the ADR is increased by +1. In step S58, a check is made to see if the HSYNC is 1 or not. If NO, this means that the reception of the data of one line is not finished yet. Therefore, the processing routine is returned to step S55 and the image data is converted into the digital data and this digital data is stored into the frame memory 105.

If the HSYNC becomes 1 and the data of one line has completely been received, step S59 follows and the VSYNC is checked. If the VSYNC is 0, the processing routine is returned to step S54 to write the data of the next line. However, if the VSYNC becomes 1, the end of the image data of one frame is detected and the processes are finished.

FIG. 6 is a flowchart for the process shown in step S4 in FIG. 4B to transmit the image data of one frame in the frame memory 105 to the host.

First, in step S60, the ADR in the RAM is set to 0 and the number of lines of one frame is set into a $CNT_2$. In step S62, the value of the ADR is output as the address signal 24 of the FM 105 and the latch signal 26 is output to latch the 6-bit image data into the register 106. In the next step S63, the latch signal 27 is output and the 8-bit density pattern as the output of the conversion ROM 107 is latched into the register 108. In step S64, the fact that the data has been defined is reported to the host through the driver 111.

In step S65, $CNT_1$ in the RAM 118 is decreased by 1 and the ADR is increased by 1. In step S66, a check is made to see if the $CNT_1$ is 0 or not, namely, to see if the transmission of the data of one line has been finished or not. If NO, the processing routine is returned to step S62 and the foregoing operations are repeated. On the contrary, if the data transmission of one line has been finished, step S67 follows and the fact that the image data of one line has completely been transmitted is reported to the host. Then, the $CNT_2$ is decreased by 1 in step S68.

In step S69, a check is made to see if the transfer of the data of one frame has been finished or not. If NO, the processing routine is returned to step S61. If YES, step S70 follows and the fact that the transfer of the image data of one frame has been finished is reported to the host and the start command is also reset and the processes are finished.

The first practical example has been described with respect to the case where the iris control, focus control, and zoom control of the TV camera, and the control of the vertical movement and rotation of the tilt plate of the TV camera are performed by the mechanical control by the rotational control of the motor. However, the zoom control may be also performed by controlling the sampling frequency of the video signal. The zoom control, focus control, and the like may be also performed by digital signal processing after converting the video signal into the digital signal. On the other hand, the iris control may be also performed by controlling the amplification factor, offset, and the like by the amplifier of the analog video signal.

Second Practical Example

Figure 7:
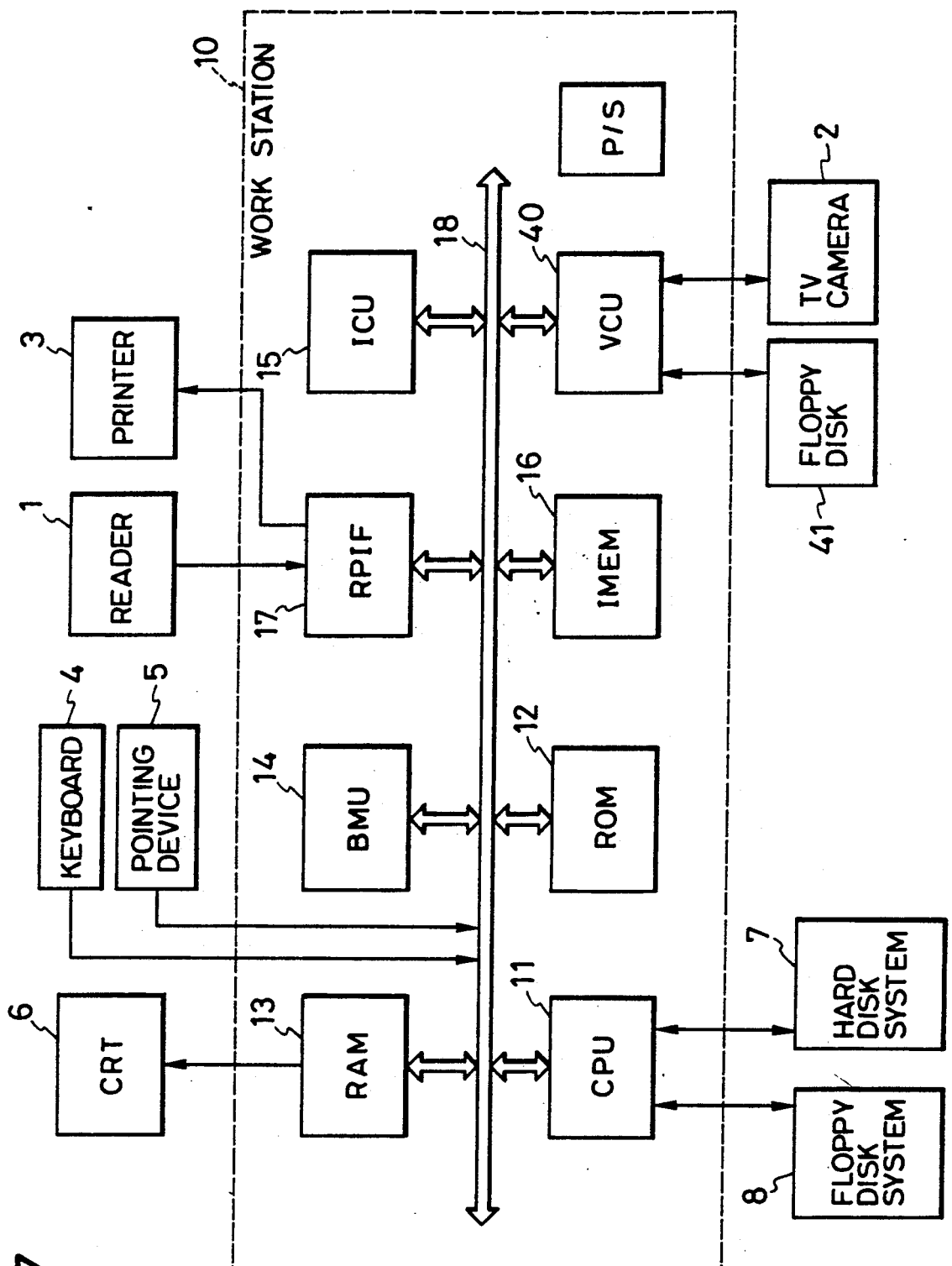
FIG. 7 is a block diagram of an image data processing apparatus of the second practical example of the invention.
Figure 8:
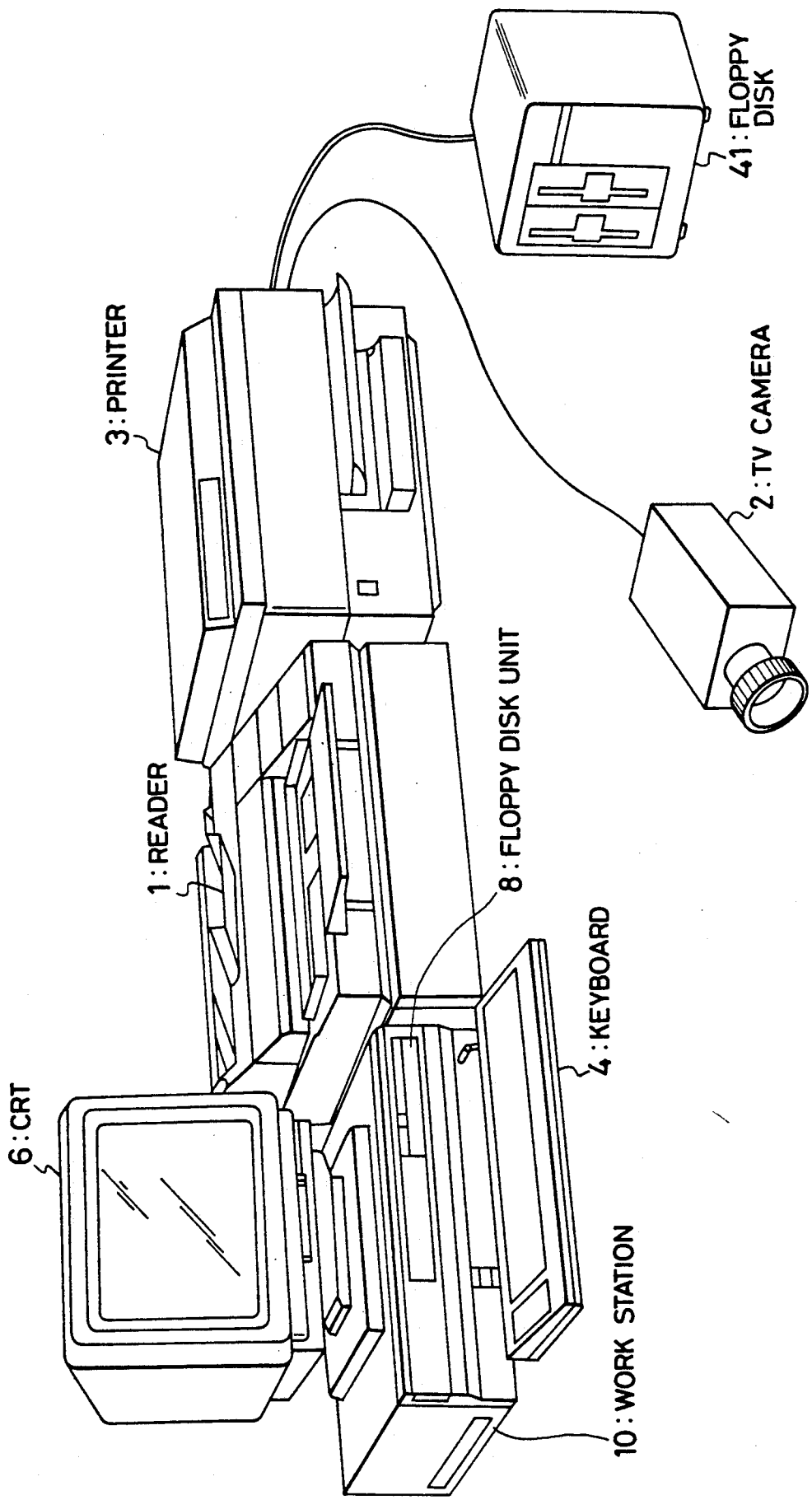
FIG. 8 is an external perspective view of the image data processing apparatus of the second practical example.

FIG. 7 is a block diagram of an image data processing apparatus showing the second practical example of the present invention. FIG. 8 is an external perspective view showing the second practical example. In the diagrams, the same parts and components are designated by the same reference numerals.

In FIG. 7, the same parts and components as those shown in FIG. 1 are designated by the same reference numerals and their descriptions are omitted. Since the composition of the video control unit (VCU) 40 in the second practical example differs from that in the first practical example, the VCU 40 will be described in detail hereinbelow.

The VCU 40 controls the interface among the TV camera 2, a floppy disk 41, and the work station 10.

FIG. 9 is a block diagram showing an internal composition of the video control unit (VCU) 40 and the same parts and components as those shown in FIG. 7 are designated by the same reference numerals.

Numeral 119 denotes an amplifier (AMP) for amplifying the composite video signal sent from TV camera 2 or an FM demodulator 135; 120 is a separation/clamp circuit for separating the composite video signal amplified by the AMP 119 into a video signal 42 and a sync signal; 125 is a separation circuit for further separating the sync signal into the horizontal sync signal (HSYNC) and the vertical sync signal (VSYNC); 121 is a sample holder for holding the video signal 42 by a sampling signal 43 from a control section 132; and 122 is an A/D converter for converting the analog video signal held by the sample holder 121 into the 8-bit digital image signal.

Numeral 123 denotes a register for latching the 8-bit digital image signal converted by the A/D converter 122 by a latch signal 44 from the control section 132; 124 is a driver/receiver for transmitting the content of the register 123 onto the bus 18 by an enable signal 45 and a direction control signal 46 which are output from the control section 132, or for inputting the data on the bus 18 into a register 126; 140 is a driver for supplying status data which is output from the control section 132 onto the bus 18 in order to report the state of the VCU 40 to the CPU 11; and 141 is a receiver for receiving the command data which is generated from the CPU 11 through the bus 18.

The register 126 latches the 8-bit digital signal from the driver/receiver 124 by a latch signal 47 from the control section 132. A D/A converter (DAC) 128 converts the 8-bit digital signal from the register 126 into the analog signal. A mixer 129 mixes the analog video signal from the DAC 128 and a horizontal sync signal ($HSYNC_0$) and a vertical sync signal ($VSYNC_0$) from the control section 132.

Numeral 130 denotes a frequency modulator for frequency modulating the composite video signal which was mixed with the sync signal, and 131 is a video driver for amplifying the video signal. When a switch 137 is connected to the side B, the video signal which was frequency modulated and amplified is input and stored into the floppy disk 41. A driver/receiver 133 comprises: a receiver section for inputting the commands and status signals which are sent from the floppy disk 41 to the control section 132; and a driver section for transmitting the commands and the like from the control section to the floppy disk 41.

Numeral 134 denotes a filter for removing the readout noise component of the modulated video signal from the floppy disk 41; 135 is the frequency demodulator for demodulating the frequency modulated (FM) wave and converting into the composite video signal; and 132 is the control section for controlling the VCU 40 and floppy disk 41 and the like. The control section 132 has a CPU 142, a ROM 138, and a RAM 139.

Figure 10A:
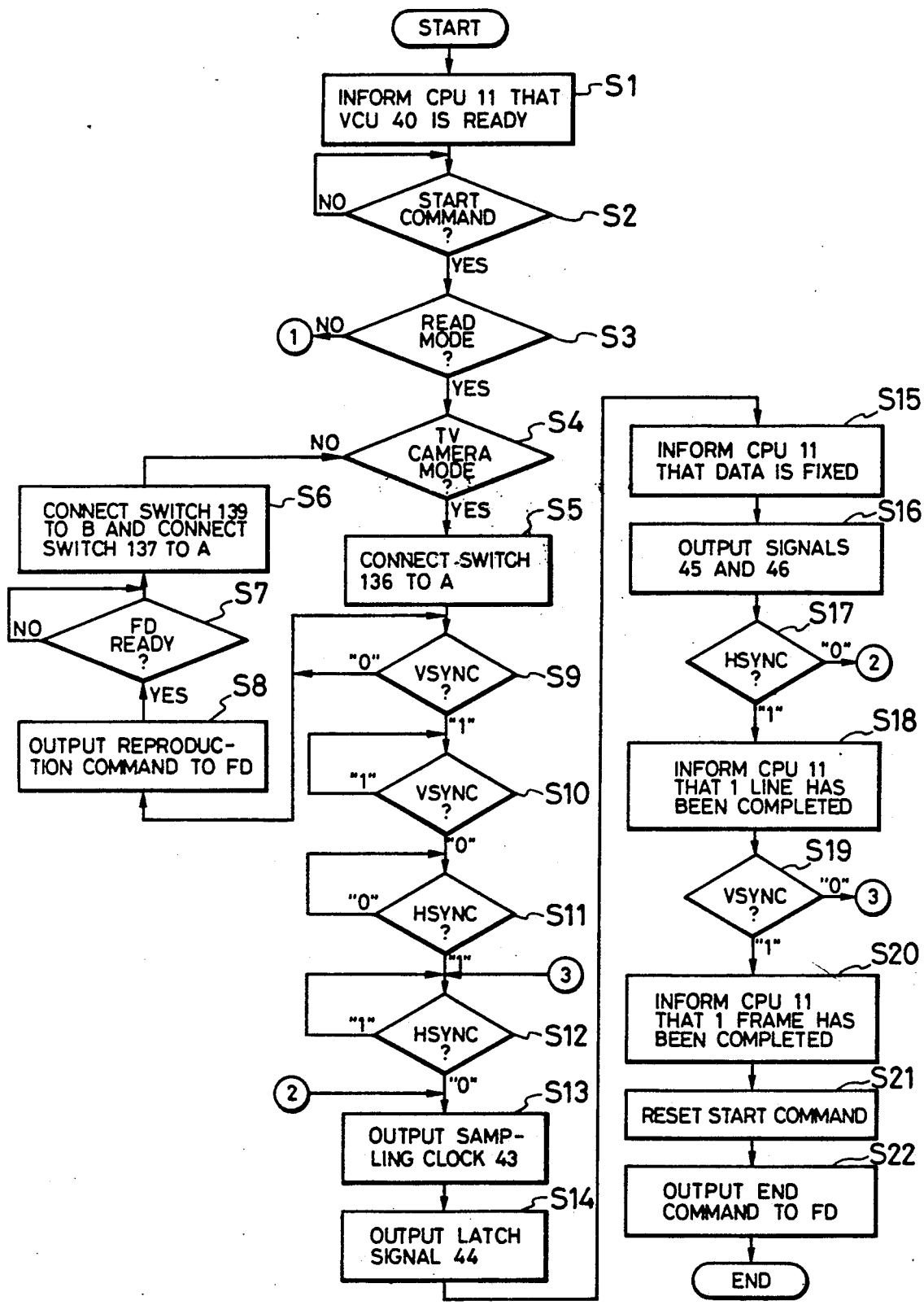
FIGS. 10A and 10B are operation flowcharts of a controller in the video control unit of the second practical example.
Figure 10B:
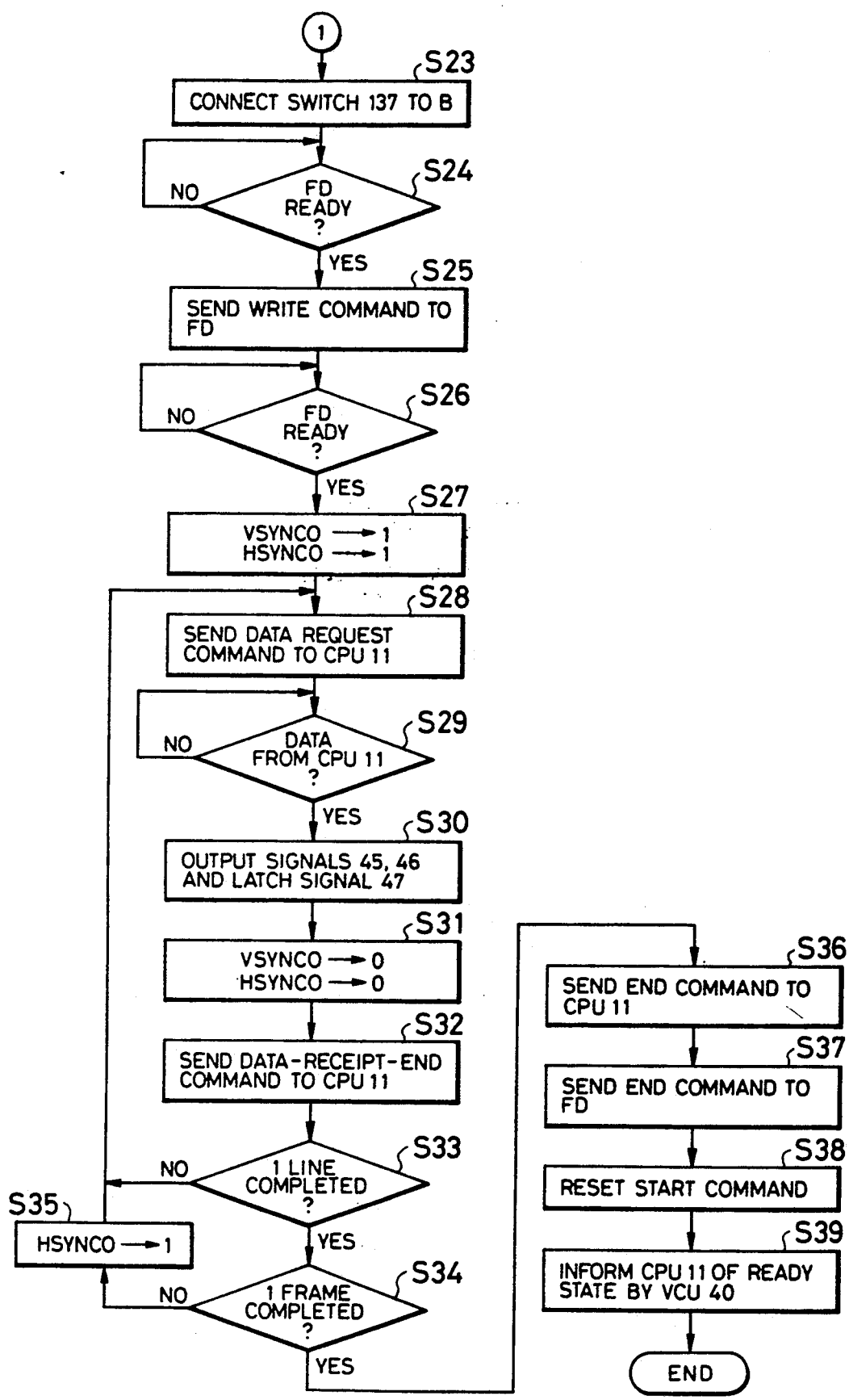

FIGS. 10A and 10B are flowcharts of operation programs which are stored in the ROM 139 and are executed by the CPU 142 in the control section 132.

The case of reading the video signal which is output from the TV camera 2 or floppy disk (FD) 41 will be first explained with reference to FIG. 10A.

In step S1, the fact that the VCU 40 is in the ready state is reported to the CPU 11. In step S2, a check is made to see if the start command has been input from the CPU 11 or not. If the start command has been input through the receiver 141, step S3 follows and a check is made to see if the CPU 11 is in the reading mode (READ mode) or not. If YES, step S4 follows. If NO, step S23 follows.

In step S4, a check is made to see if the operating mode is the mode to input the image data from the TV camera 2 or not. If YES, step S5 follows and a switch 136 is connected to the side A. On the contrary, if NO, step S6 follows and the switch 136 is connected to the side B and the switch 137 is connected to the side A, respectively, thereby enabling the image data from the floppy disk (FD) 41 to be input. In step S7, a check is made to see if the FD 41 is in the ready state or not through the drive/receiver 133. If YES, step S8 follows and a reproduction command (command to read out the image data) is output to the FD 41 through the driver/receiver 133. Then, step S9 follows.

In step S9, the video signal sent from the TV camera 2 or FD 41 is amplified and the sync signals are separated and the apparatus waits until the VSYNC signal is output.

Since the frequency modulated image data has been stored in the FD 41, when the image data is read out of the FD 41, the harmonic noise signal and the like are removed from the image data by the filter 134. The image data is then demodulated into the composite video signal by the frequency demodulator 135. The vertical sync signal (VSYNC) is separated from the demodulated video signal and input and thereafter, the processing routine advances to step S10. In step S10, the trailing edge of the VSYNC is detected. In steps S11 and S12, a check is made to see if the horizontal sync signal (HSYNC) has been input or not. If YES, step S13 follows and the sampling signal 43 is output to the sample holder 121. In step S14, the latch signal 44 is output to the register 123 and the 8-bit digital image data which is output from the A/D converter 122 is latched.

In step S15, the fact that the data has been fixed is reported to the CPU 11 through the driver 140. In step S16, the enable signal 45 and direction control signal 46 are output to the driver/receiver 124 and the image data of one byte is output to the CPU 11. The CPU 11 allows the data on the bus 18 to be written into the IMEM 16 or BMU 14 by the signal from the driver 140.

In step S17, the HSYNC signal is checked to see if the output of the data of one line has been finished or not. If the HSYNC is "0", the processing routine is returned to step S13 and the foregoing operations are repeated. If the HSYNC is "1", step S18 follows and the fact that the data transfer of one line has been finished is reported to the CPU 11 through the driver 140. In step S19, the VSYNC signal is checked to see if the output of the data of one frame has been finished or not. If the VSYNC is "0", the processing routine is returned to step S12 in order to input the data of the next line. If the VSYNC is "1", this means that the data transfer of one frame has been completed, so that the processing routine advances to step S20 and the end of data transfer of one frame is reported to the CPU 11 through the driver 140. In step S21, the start command is reset. In step S22, the end command is sent to the FD 41 and the processes are finished.

The case of recording the image data into the FD 41 will now be described with reference to FIG. 10B.

In this case, since the answer is NO in step S3, step S23 follows and the switch 137 is connected to the side B. In step S24, a check is made to see if the FD 41 is in the ready state or not through the driver/receiver 133. In step S25, the write command is output to the FD 41 through the driver/receiver 133. In step S26, a check is made to see if the FD 41 is in the ready state or not. In step S27, the $HSYNC_0$ and $VSYNC_0$ signals are output to the mixer 129.

In step S28, a request for data transmission is output from the driver 140 to the CPU 11. In step S29, a check is made to see if the data has been input from the CPU 11 or not. If YES, step S30 follows and the enable signal 45 and direction control signal 46 are output, the data is input from the driver/receiver 124, and the digital image data input to the register 126 is latched by the latch signal 47.

In step S31, both of the $HSYNC_0$ and $VSYNC_0$ signals are set to "0" and the analog image signal output from the DAC 128 is converted into the NTSC signal by the mixer 129. The NTSC signal is then frequency modulated by the frequency modulator 130 and amplified by the video driver 131 and then transmitted to the FD 41. On the other hand, after the data of one byte has completely been received, the end of data reception command is output to the CPU 11 in step S32. In step S33, a check is made to see if the reception of the data of one line has been finished or not. If NO, the processing routine is returned to step S28. If YES, step S34 follows and a check is made to see if the data reception of one frame has been finished or not. If NO, the $HSYNC_0$ is set to "1" and the horizontal synchronization is performed. Then, the processing routine is returned to step S28 and the foregoing operations are repeated.

After completion of the data reception of one frame, step S36 follows and the end command is output to the CPU 11. In step S37, the end command is output to the FD 41 through the driver/receiver 133 and the file is closed. In step S38, the start command is reset. In step S39, the fact that the VCU 40 is in the ready state is reported to the CPU 11 through the driver 140.

As described above, the image data of one frame from the TV camera 2 or FD 41 is written into the IMEM 15 by the CPU 11 or written into the IMEM 16 in the DMA mode by the BMU 14. The image data of one frame stored in this manner is written into the RAM 13 and displayed on the CRT 6 or subjected to the image processes such as enlargement, reduction, rotation, movement, cut-out, and the like by the BMU 14. Subsequently, the image data is written into the hard disk system 7 or the like or printed and output as a recording image by the printer 3. Further, the image data stored in the hard disk system 7 and the like is written into the IMEM 16 by the BMU 14. The image data in the IMEM 16 is output and stored into the FD 41 through the VCU 40.

In the above practical example, the image data has been transmitted and received through the data bus.

However, a dedicated bus for only the image data may be also provided.

Third Practical Example

An overall composition of the image data processing apparatus in this practical example is substantially the same as that shown in FIG. 7 in the second practical example except that the floppy disk 41 is not provided; therefore, its detailed description is omitted. In the third practical example, the constitution of the video control unit (VCU) 40 differs from that in the second practical example; therefore, it is described in detail hereinbelow.

Figure 11:
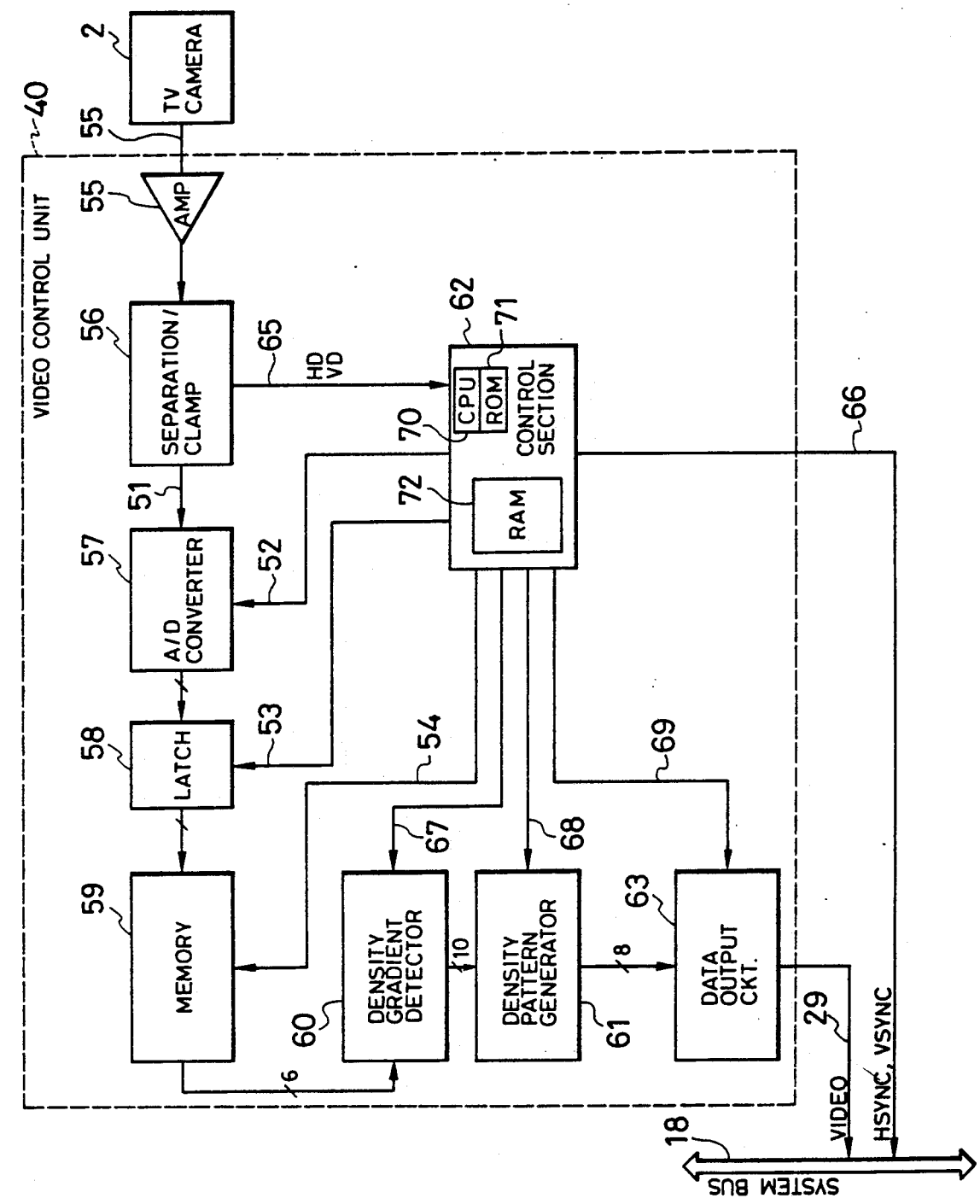
FIG. 11 is a block diagram of a video control unit (VCU) of the third practical example.

FIG. 11 is a block diagram showing the constitution of the video control unit (VCU) 40 and the same parts and components as those shown in FIG. 7 are designated by the same reference numerals.

Reference numeral 55 denotes an amplifier (AMP) for amplifying an NTSC signal 50 from the TV camera 2, and 56 is a separation/clamp circuit for separating a video signal 51 and sync signals (HD and VD) from the amplified NTSC signal. HD is the horizontal sync signal and VD is the vertical sync signal. Numeral 57 is an A/D converter for converting the analog video signal 51 into the multi-value image data of a few bits synchronously with a sampling clock 52 from a control section 62; 58 is a latch circuit for latching the data from the A/D converter 57; 59 is a memory for storing the multi-value image data of one frame in accordance with an address and control signal 54 from the control section 62; and 62 is the control section for controlling the whole VCU 40. The control section 62 comprises: a CPU 70; a ROM 71 for storing the control programs which are executed by the CPU 70 and data; a RAM 72 serving as a work area; and the like.

A density gradient detector 60 refers the data of the peripheral pixels around a target pixel and detects the direction of the density gradient on the basis of the multi-value image data of one frame which is read out of the memory 59. The patterns for every direction of the density gradient are stored in a density pattern generator 61. On the basis of the density of the target pixel and the direction of the density gradient, the corresponding pattern is selected and output from the density pattern generator 61. A data output circuit 63 converts the parallel data output of the density pattern generator 61 into the serial data synchronously with a signal 69 from the control section 62 and outputs as a video signal 64 to the system bus 18.

The horizontal and vertical sync signals (HD and VD) 65 separated by the separation/clamp circuit 56 are also transmitted to the system bus 18 as the sync signals 66 of the video signal 64 from the data output circuit 63 by the control section 62.

Figure 12:
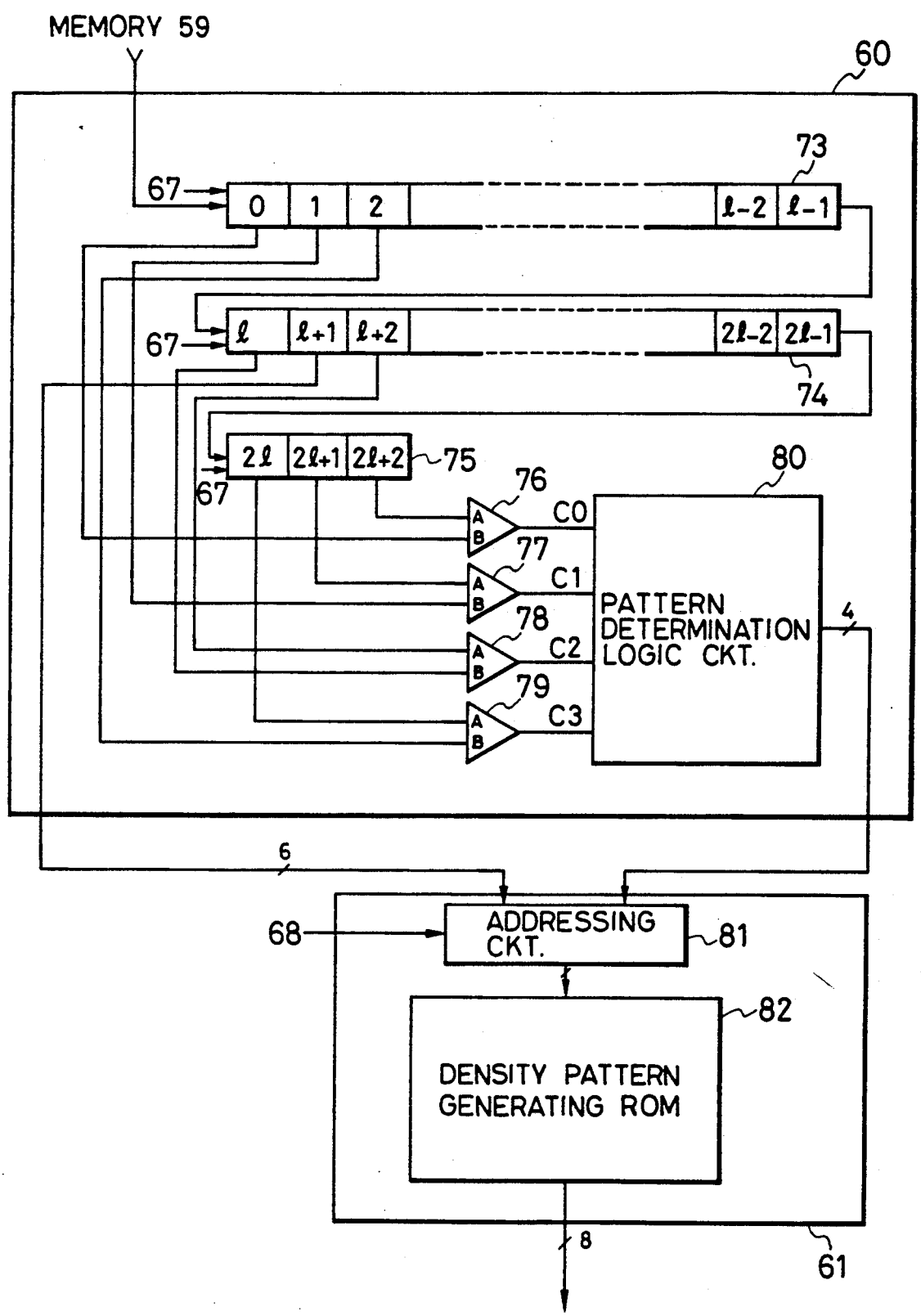
FIG. 12 is a block diagram of a density gradient detector and a density pattern generator in FIG. 11.

FIG. 12 is a block diagram showing constitutions of the density gradient detector and density pattern generator.

Reference numerals 73 and 74 denote line buffers and 75 is a line memory of three pixels. Each of the line buffers 73 and 74 and line memory 75 latches the multi-value image data from the memory 59 synchronously with a clock signal 67 from the control section 62. Now, assuming that the data of pixel (l+1) is the target pixel, the density gradient in the vertical direction can be detected by comparing the pixel (1) and the pixel (2l+1). The density gradient in the lateral direction can be detected by comparing the pixel (l) and the pixel (l+2). The density gradients in the oblique directions can be detected by comparing the pixel (0) and the pixel (2l+2) and by comparing the pixel (2) and the pixel (2l), respectively. Numerals 76 to 79 denote comparators for comparing the densities of the respective pixels. A pattern determination logic circuit 80 selects one of ten kinds of patterns as shown in FIG. 13, (a) to (j), on the basis of the respective outputs $C_0$, $C_1$, $C_2$, and $C_3$ of the comparators 76 to 79.

The outputs of the comparators 76 to 79 are set in a manner such that the outputs are 1 when A>B by comparing the inputs A and B, and the outputs are 0 when A=B, and the outputs are −1 when A<B. Therefore, now, assuming that $C_0=-1$, $C_1=0$, $C_2=-1$, and $C_3=1$, it will be understood that the pixels having large densities exist in the left half portion around the pixel (l+1) as the center. Consequently, it is determined that the pattern belongs to the pattern shown in FIG. 13, (a) and this pattern is converted into the code of, e.g., (0000).

Figure 13:
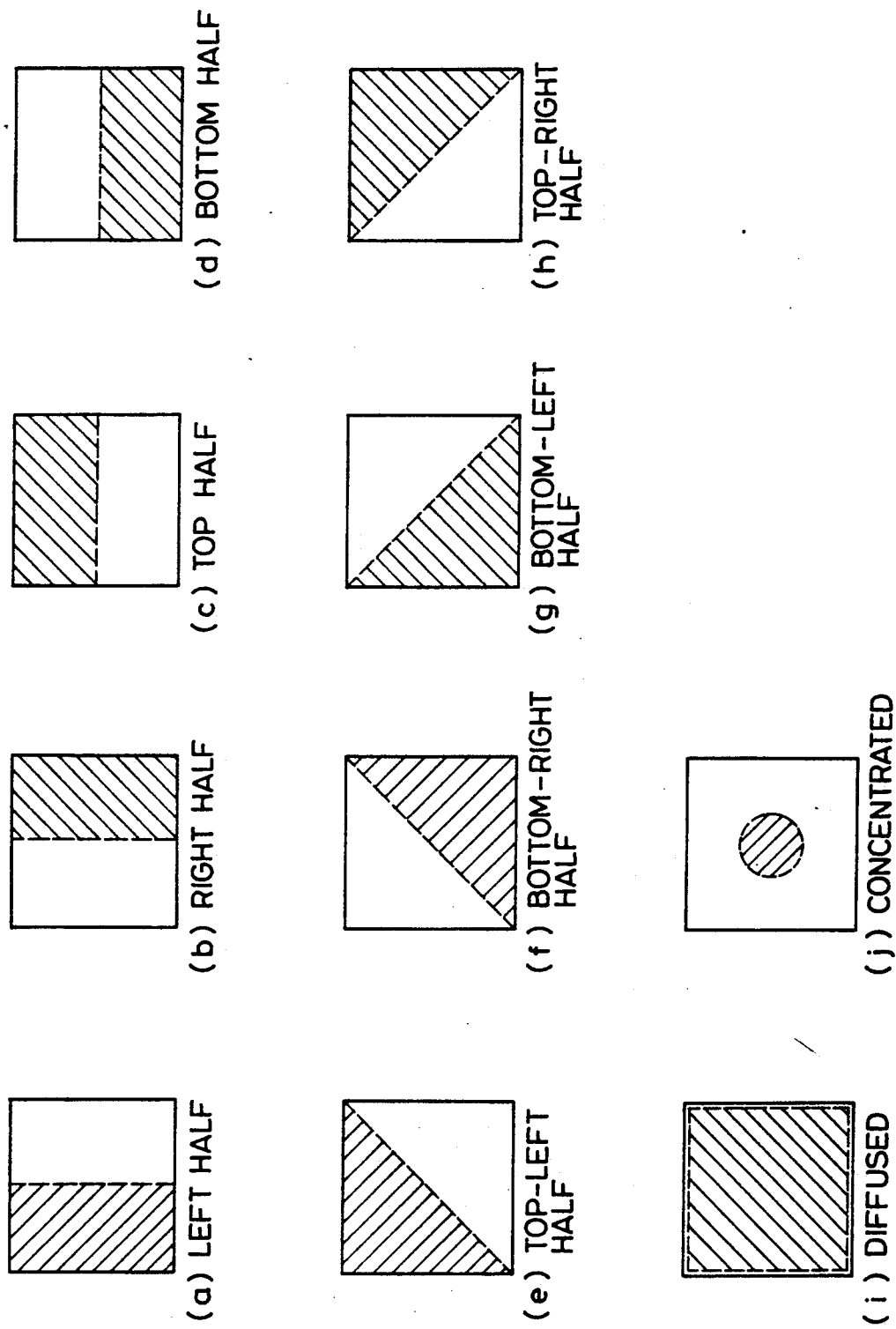
FIG. 13, (a) to (j), is a diagram showing an example of the kinds of patterns due to the difference of the density gradients.

In a manner similar to the above, for example, if it is decided that the pattern belongs to the right half pattern shown in FIG. 13, (b), this pattern is converted into the code of, e.g., (0001). Therefore, ten kinds of codes can be selected in correspondence to the respective patterns in FIG. 13, (a) to (j). Both of the four bits of each code and the bits (six bits in the case of 64 gradations) indicative of the density value of the target pixel (in this case, the pixel (l+1)) are output supplied to the density pattern generator 61.

In the generator 61, the above-mentioned data of ten bits is input to an addressing circuit 81 synchronously with a signal 68 from the control section 62. The address in a density pattern generating ROM 82 corresponding to this data is accessed and the density pattern data (consisting of eight bits in the case of 64 gradations) is output.

Figure 14:
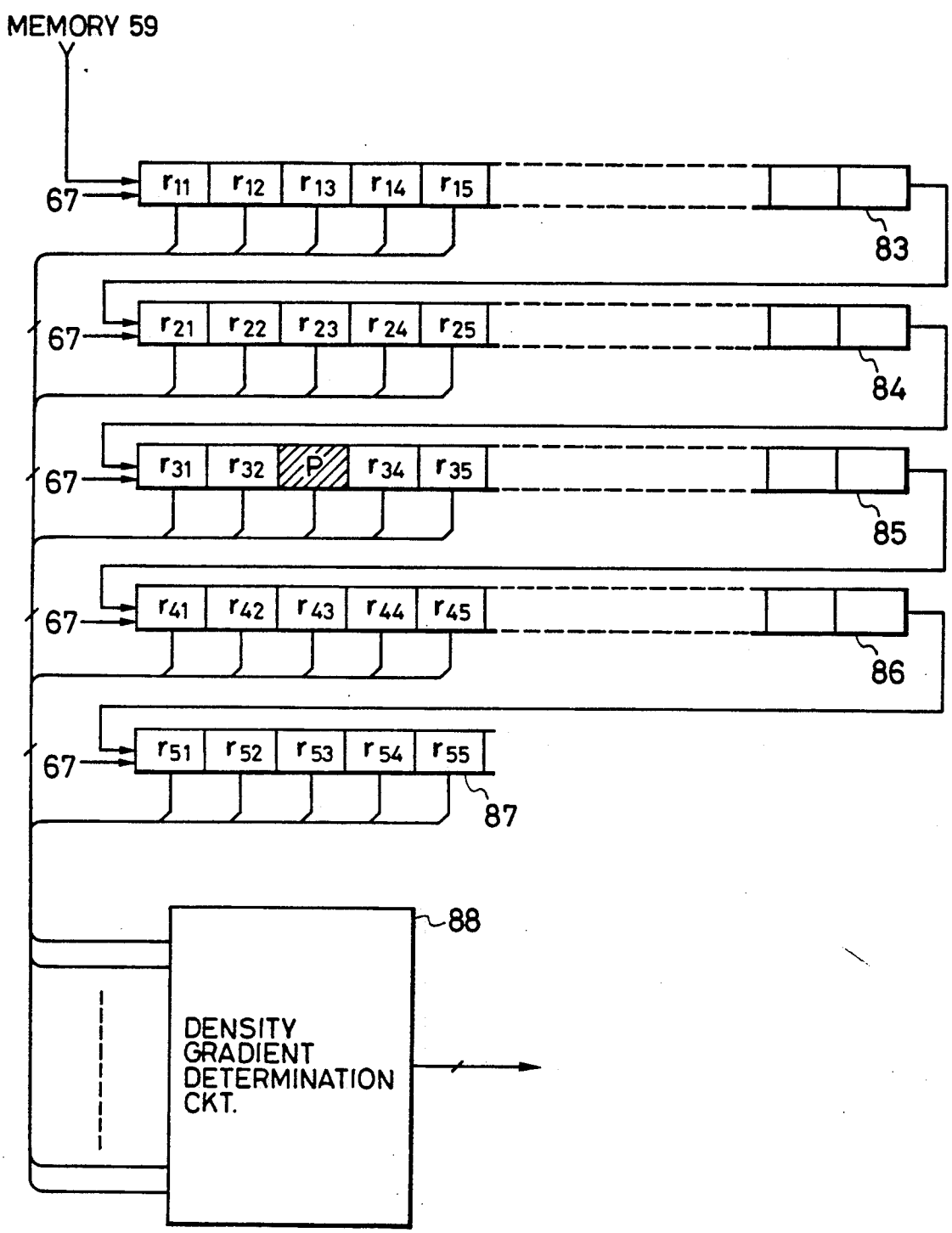
FIG. 14 is a diagram showing an example of another circuit constitution of the density gradient detector in FIG. 11.

FIG. 14 is a diagram showing an example of another circuit constitution of the density gradient detector 60 in FIG. 11. By providing line buffers 83 to 86, a line memory 87 of five pixels, and a density gradient determination circuit 88 for deciding the density gradient on the basis of the pixel data, twenty-four near pixels around the target pixel P can be checked, so that the finer density gradient can be known. By comparing the density differences between the target pixel P and all of the peripheral pixels $r_{ij}$ ($1 \leq i$, $j<5$), the further fine density gradient can be decided.

Fourth Practical Example

An overall constitution of the image data processing apparatus in the fourth practical example is substantially the same as that shown in FIG. 7 in the second practical example except that the floppy disk 41 is not provided; therefore; its detailed description is omitted. In this practical example, since the constitution of the video control unit (VCU) differs from that in the second practical example, it will be explained in detail hereinbelow.

Figure 15:
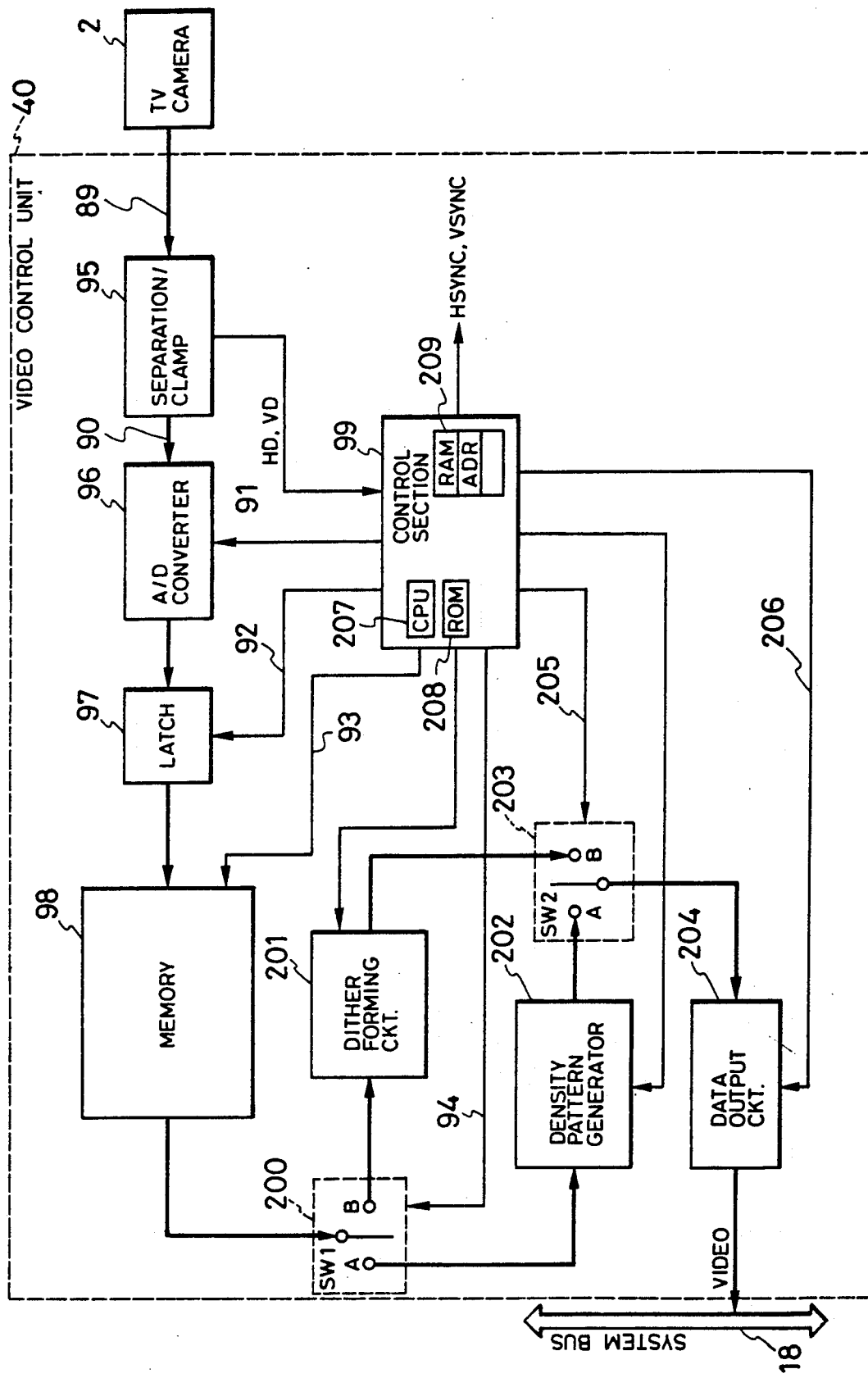
FIG. 15 is a block diagram of a video control unit (VCU) of the fourth practical example.

FIG. 15 is a block diagram showing a composition of the video control unit (VCU) 40 and the same parts and components as those shown in FIG. 7 are designated by the same reference numerals.

Numeral 95 denotes a separation/clamp circuit for separating a video signal 90 and sync signals (HD and VD) from an NTSC signal 89 from the TV camera 2. HD is the horizontal sync signal and VD is the vertical sync signal. An A/D converter 96 converts the analog video signal 90 into the multi-value image data of a few bits synchronously with a sampling clock 91 from a control section 99. A latch circuit 97 latches the multi-value data from the A/D converter 96. A memory 98 stores the multi-value image data of one frame in response to an address and control signal 93 from the control section 99. The control section 99 controls the whole VCU 40 and comprises: a CPU 207; a ROM 208 for storing the control programs which are executed by the CPU 207 and data; a RAM 209 serving as a work area; and the like.

Numeral 200 denotes a switch SW$_1$ for switching the multi-value image data read out of the memory in accordance with a switching signal 94; 201 is a dither forming circuit for dithering the multi-value image data and converting into the binary image data; 202 is a density pattern generator for assigning the density patterns to the multi-value image data; and 203 is a switch SW$_2$ for selecting and outputting one of the binary image data from the dither forming circuit 201 and the binary image data from the density pattern generator 202 in correspondence to a switching signal 205. Numeral 204 is a data output circuit for converting the selected binary image data into the video signal and outputting it.

Figure 16:
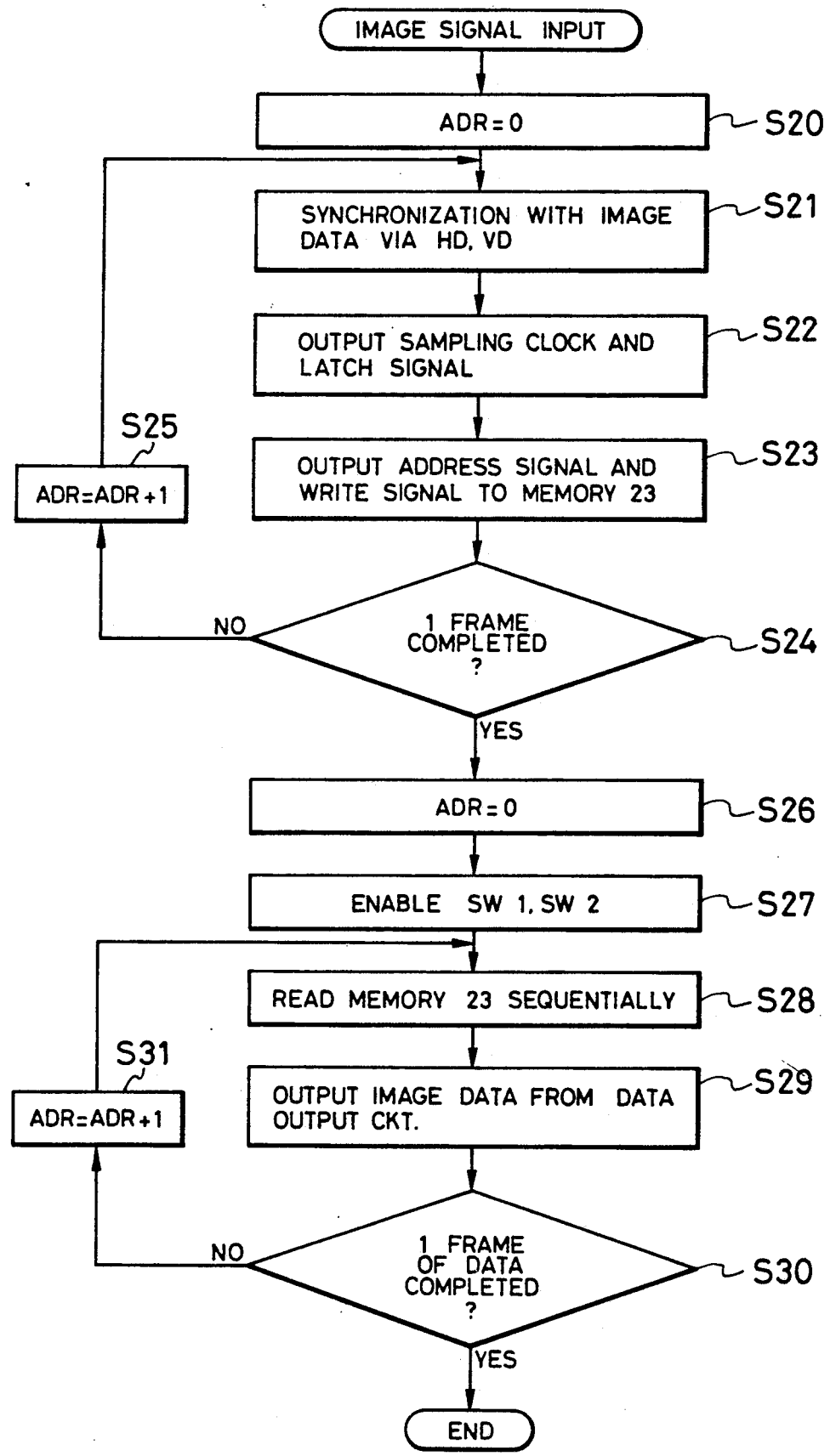
FIG. 16 is an operation flowchart of a controller in the video control unit of the fourth practical example.

FIG. 16 is an operation flowchart of the control programs which are stored in the ROM 208 in the control section 99 in the VCU 40 and which are executed by the CPU 207.

First, in step S20, the address data ADR in the RAM 209 is set to 0. In FIG. 15, the NTSC signal 89 from the TV camera 2 is separated into the video signal 90 and the sync signals of HD and VD by the separation/clamp circuit 95. Therefore, in step S21, the synchronization with the image data is attained on the basis of the sync signals. Namely, the horizontal sync signal HD is used for synchronization for every image data. The vertical sync signal VD is used as the first signal for synchronization of the image data of one frame.

In step S22, the sampling clock 91 is output and a latch signal 92 is subsequently output after the lapse of the converting time of the A/D converter 96. In the next step S23, the signal 93 including the address data from the ADR and the control signal such as the write signal and the like is output and the multi-value image data is written into the memory 98. In step S24, a check is made to see if the reception of the multi-value image data of one frame has been finished or not. If NO, step S25 follows and the content of the ADR is increased by +1. Then, the processing routine is returned to step S21 and the foregoing operations are repeated.

After the multi-value image data of one frame was written into the memory 98, the content of the ADR is set to 0 in step S26. In step S27, the switches SW$_1$ (200) and SW$_2$ (203) are switched by the switching signals 94 and 205, respectively.

Thus, the multi-value image data which is read out of the memory 98 is selectively transmitted by the switch SW$_1$ (200) to the dither forming circuit 201 in the case of the output on the CRT and to the density pattern generator 202 in the case of the output by the printer.

The dither forming circuit 201 converts the multi-value image data into the binary image data by the threshold matrix (4×4 in the case of 16 gradations) in a one-to-one corresponding manner. The density pattern generator 27 converts the multi-value image data into the patterns corresponding to each pixel density. For example, in the case of 16 gradations, the multi-value data of one pixel is converted into the patterns of 4×4, i.e., sixteen binary data. For example, when the resolution of the CRT 6 is 4 pel and the resolution of the printer 3 is 16 pel, the sizes of the output images are seemingly equalized by the above method.

In step S28, the signal 93 including the address signal and control signal is output to the memory 98, thereby sequentially reading out the multi-value image data from the memory 98. In step S29, the binary data is sent to a data output circuit 204 by the switch SW$_2$ (203) which was switched by the switching signal 205 from the control section 99 in correspondence to the switch SW$_1$ (200), this binary data is then subjected to the parallel-to-serial conversion and the like and thereafter, it is output onto the system bus 18 synchronous with a sync signal 206 from the control section 99.

In step 30, a check is made to see if the data of one frame has been output or not. If NO, step S31 follows and the ADR is increased by +1. Then, the processing routine is returned to step S28 and the above operations are repeated until the image data of one frame is completely output.

As described above, when there is a difference of four times between the resolutions of the output apparatuses such as the CRT and printer, sixteen gradations are suitable. If there is a difference of eight times between the resolutions, it is proper to set 64 (=8×8) gradations. In this manner, by changing the sizes of density patterns, a good picture quality can be obtained even if various output apparatuses having different resolutions are used.

Figure 17:
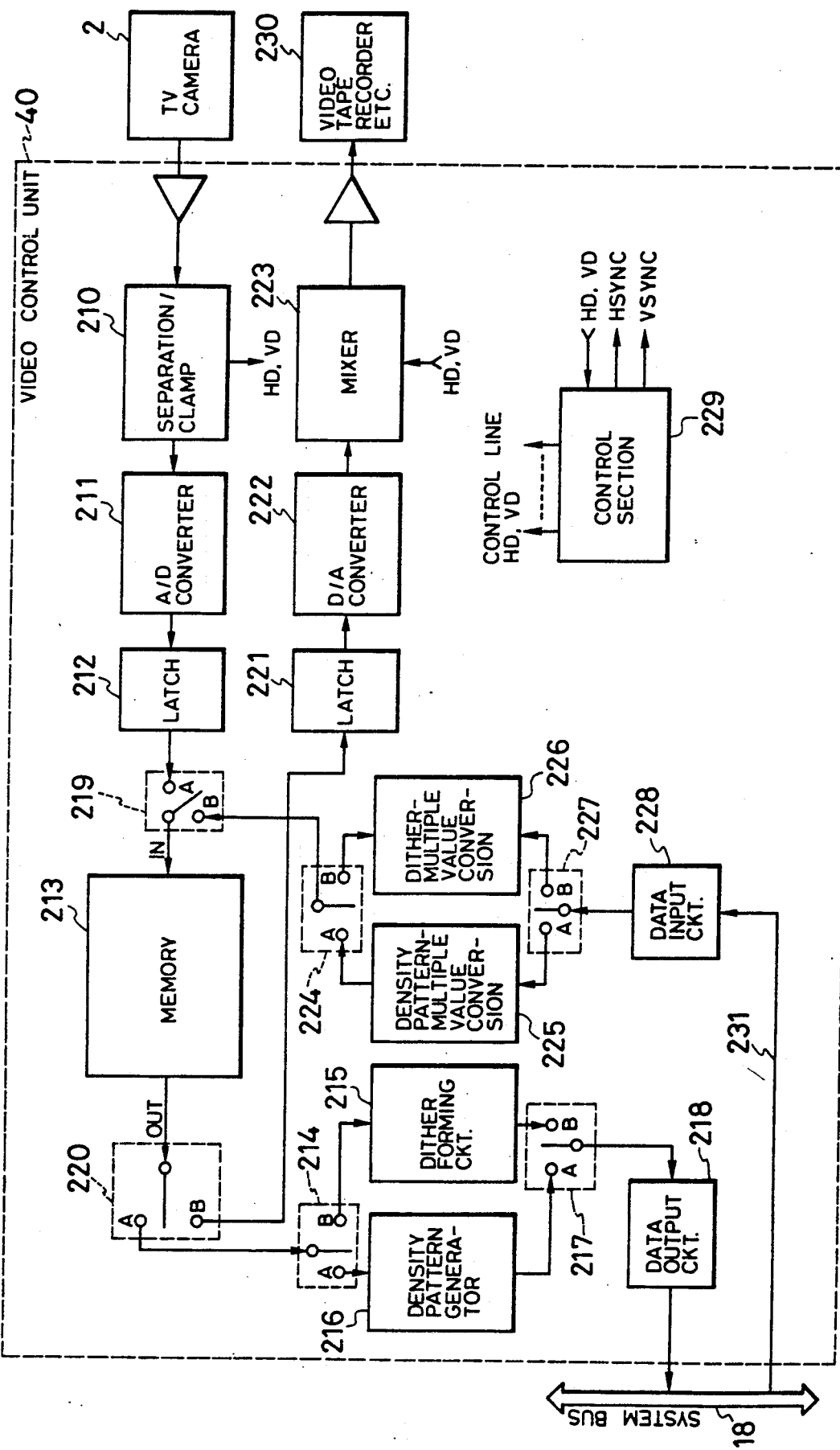
FIG. 17 is a block diagram of another circuit constitution of a VCU in the case where by connecting a video tape recorder and the like, still images can be also recorded, preserved, and reproduced.

FIG. 17 is a diagram showing another circuit composition of the video control unit (VCU) 40. A latch 221, a D/A converter 222, and a mixer 223 for outputting an analog image signal together with horizontal and vertical sync signals are further added. By connecting a switch 219 to the side A and a switch 220 to the side B, the image signal from the TV camera 2 can be again output as an analog image signal 230 to the recording apparatus such as video tape recorder, floppy disk, or the like.

Further, a data input circuit 228, a density pattern-multiple value converter 225 for converting the binary data into the multi-value data, and a dither-multiple value converter 226 for converting the binary image data into the multi-value image data are provided, thereby comprising the circuits opposite to a density pattern generator 216 and a dither forming circuit 215.

For example, the image data which was input as a serial image signal 231 is input to the data input circuit 228 and converted into the parallel data. Thereafter, by switching a switch 227, this parallel data is transmitted through either one of the converters 225 and 226 and converted into the multi-value image data. This multi-value image data is transmitted through a switch 224. When the switch 219 is connected to the side B, the multi-value image data is sequentially stored into a memory 213.

When the switch 220 is connected to the side B, the data which was sequentially read out of the memory 213 is transmitted through the latch 221, D/A converter 222, and mixer 223 and output as the analog image signal 230. With this constitution, a video tape recorder and the like can be connected in addition to the TV camera 2, so that the still images can be also recorded and preserved and reproduced.

As described above, according to the present invention, while the image data which is output from the TV camera is directly monitored by the display apparatus of the image data processing system, for example, the diaphragm, zoom, and focus of the TV camera, and the rotation, vertical movement, and the like of the tilt plate of the TV camera can be controlled by the control signals which are output from the image data processing system. After the optimum image data was confirmed, it can be input. The TV camera can be controlled and adjusted while monitoring the image data from the TV camera; therefore, the optimum image data from the TV camera can be input.

According to the invention, the image data which is output from the TV camera can be directly input to the image data processing apparatus. Further, the image data transmitted from the TV camera and floppy disk system can be mixed to the other image data, document data, and the like and can be processed. In addition, the stereoscopic image photographed by the TV camera 2 can be directly output as the recording image by the printer.

On the other hand, the image data from the TV camera is input and digitized and the digital image data can be further written into and read out from the memory apparatus such as the floppy disk system or the like. Various image processes can be performed.

In addition, obviously, the image data written into the floppy disk can be similarly read out and edited by other apparatuses.

Moreover, according to the invention, the density pattern is determined by the density gradients of the peripheral pixels around the target pixel. Therefore, the continuous image data having wide gradations and a good quality is obtained.

Further, according to the foregoing embodiments, the systematic dither method and density pattern method can be switched and used in accordance with the resolution of the output apparatus. Therefore, the image data to be output can be switched in accordance with the output apparatus and the output image according to the characteristics of the output apparatus can be obtained.

What is claimed is:

1. Image processing apparatus comprising:
   input means for inputting an analog video signal;
   first conversion means for converting the input analog video signal into multi-value data;
   memory means for storing the multi-value data; and
   second conversion means for converting the multi-value data stored in said memory means to binary data when executing its conversion process, wherein said second conversion means (1) detects a density gradient by comparing the multi-value data of pixels around a pixel to be converted with each other in each of vertical, lateral, and oblique directions, and (2) selects a multi-bit image pattern from a plurality of image patterns, in response to the detected density gradient.

2. An apparatus according to claim 1, further comprising additional memory means for storing the plurality of image patterns comprising binary data.

3. An apparatus according to claim 1, wherein said input means comprises a TV camera.

4. An apparatus according to claim 1, wherein said input means comprises a magnetic recording unit in which analog video signals are recorded.

5. An apparatus according to claim 1, wherein said output means comprises a CRT display.

6. An apparatus according to claim 1, wherein said output means comprises a printer.

7. An apparatus according to claim 1, further comprising additional memory means for storing binary data comprising the binary data converted by said second conversion means.

8. An apparatus according to claim 1, wherein said second conversion means comprises (1) matrix memory means for storing in matrix form a plurality of pixel data comprising the multi-value data, and (2) means for comparing the pixel data stored in said matrix memory means with each other and for detecting the density gradient.

9. An image processing apparatus comprising:
   input circuitry for inputting an analog video signal;
   first conversion circuitry for converting the analog video signal input by said input circuitry into multi-value data;
   a memory for storing the multi-value data converted by said first conversion circuitry; and
   second conversion circuitry for converting the multi-value data stored in said memory into binary data, wherein said second conversion circuitry (1) detects a density gradient by comparing the multi-value data of pixels around a pixel to be converted with each other in each of vertical, lateral, and oblique directions, and (2) selects a multi-bit image pattern from a plurality of image patterns in response to the detected density gradient.

10. An apparatus according to claim 9, further comprising an additional memory for storing the plurality of image patterns comprising binary data.

11. An apparatus according to claim 9, further comprising an additional memory means for storing binary data comprising the binary data converted by said second conversion circuitry.

12. An apparatus according to claim 9, wherein said second conversion circuitry comprises (1) a matrix memory for storing in matrix form a plurality of pixel data comprising the multi-value data, and (2) means for comparing the pixel data stored in said matrix memory with each other and for detecting the density gradient.

* * * * *

UNITED STATES PATENT AND TRADEMARK OFFICE
CERTIFICATE OF CORRECTION

PATENT NO. : 5,006,937
DATED : April 9, 1991
INVENTOR(S) : Hiroshi Nonoshita et al.

It is certified that error appears in the above-identified patent and that said Letters Patent is hereby corrected as shown below:

ON THE TITLE PAGE:

[56] References Cited:

"57-082 4/1982 Japan" should read --57-57082 4/1982 Japan--.

COLUMN 4:

Line 40, "pattern" should read --pattern;--.

COLUMN 5:

Line 2, "Tv" should read --TV--.

COLUMN 12:

Line 52, "provided;" should read --provided and--.

Line 53, "therefore;" should read --therefore,--.

Line 57, "a" (second occurrence) should read --the--.

Signed and Sealed this

Second Day of March, 1993

Attest:

STEPHEN G. KUNIN

*Attesting Officer*　　　*Acting Commissioner of Patents and Trademarks*